(12) United States Patent
Brueckert et al.

(10) Patent No.: US 8,978,260 B2
(45) Date of Patent: Mar. 17, 2015

(54) GAUGE FOR MEASURING A PORTION OF A RAILCAR ARTICULATED CONNECTOR

(71) Applicant: TTX Company, Chicago, IL (US)

(72) Inventors: Richard A. Brueckert, Elmhurst, IL (US); William A. Guess, Omaha, NE (US); Donald F. Kroesch, Minooka, IL (US)

(73) Assignee: TTX Company, Chicago, IL (US)

( * ) Notice: Subject to any disclaimer, the term of this patent is extended or adjusted under 35 U.S.C. 154(b) by 97 days.

(21) Appl. No.: 13/749,305

(22) Filed: Jan. 24, 2013

(65) Prior Publication Data

US 2013/0326896 A1 Dec. 12, 2013

Related U.S. Application Data

(60) Provisional application No. 61/590,675, filed on Jan. 25, 2012.

(51) Int. Cl.
| | |
|---|---|
| *G01B 3/50* | (2006.01) |
| *G01B 5/30* | (2006.01) |
| *B23P 6/00* | (2006.01) |
| *B23K 37/00* | (2006.01) |
| *B61G 7/00* | (2006.01) |
| *B23K 31/02* | (2006.01) |
| *H05B 6/10* | (2006.01) |

(52) U.S. Cl.
CPC ... *G01B 5/30* (2013.01); *B23P 6/00* (2013.01); *B23K 37/00* (2013.01); *B61G 7/00* (2013.01); *B23K 31/02* (2013.01); *H05B 6/101* (2013.01)
USPC .......................................... 33/501.05; 33/651

(58) Field of Classification Search
USPC ...... 33/1 Q, 501.05, 501.08, 501.5, 541, 546, 33/651
See application file for complete search history.

(56) References Cited

U.S. PATENT DOCUMENTS

| | | | |
|---|---|---|---|
| 6,944,925 B2 | 9/2005 | Brueckert et al. | |
| 7,059,062 B2 | 6/2006 | Brueckert et al. | |
| 7,360,318 B2* | 4/2008 | Brueckert et al. | 33/645 |
| 7,490,393 B2 | 2/2009 | Brueckert et al. | |
| 7,861,433 B2* | 1/2011 | Saeler | 33/546 |
| 8,220,175 B2* | 7/2012 | Saeler | 33/546 |
| 2010/0024232 A1* | 2/2010 | Saeler | 33/546 |
| 2011/0197461 A1* | 8/2011 | Saeler | 33/546 |

OTHER PUBLICATIONS

International Search Report and the Written Opinion for International Application No. PCT/US2013/023074, dated Jul. 17, 2013, 28 pages.

* cited by examiner

*Primary Examiner* — G. Bradley Bennett
(74) *Attorney, Agent, or Firm* — Banner & Witcoff, Ltd.

(57) ABSTRACT

An apparatus for measuring a portion on an articulated connector relative to a reference portion of said connector is provided. The apparatus comprises a fixable base mountable to the connector against the reference portion of the connector, an arm pivotally mounted to the base and extendable toward the portion of the connector, the arm having a measurement portion, the measurement portion movable across at least a section of the portion of the connector, and a rotating component connected to a mounting piece.

8 Claims, 25 Drawing Sheets

MANUAL PROCESS

SEMI-AUTOMATIC PROCESS

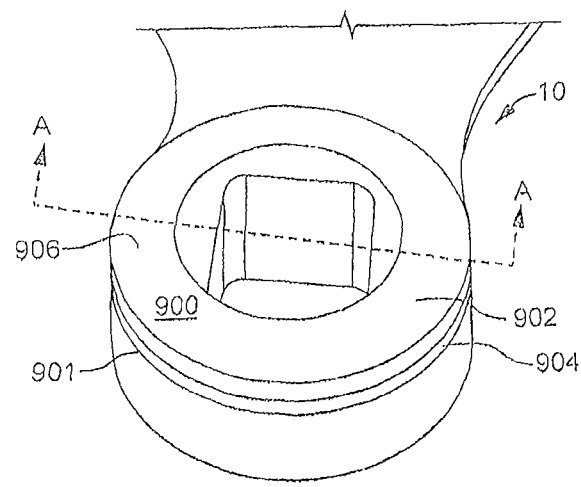
FIG. 12
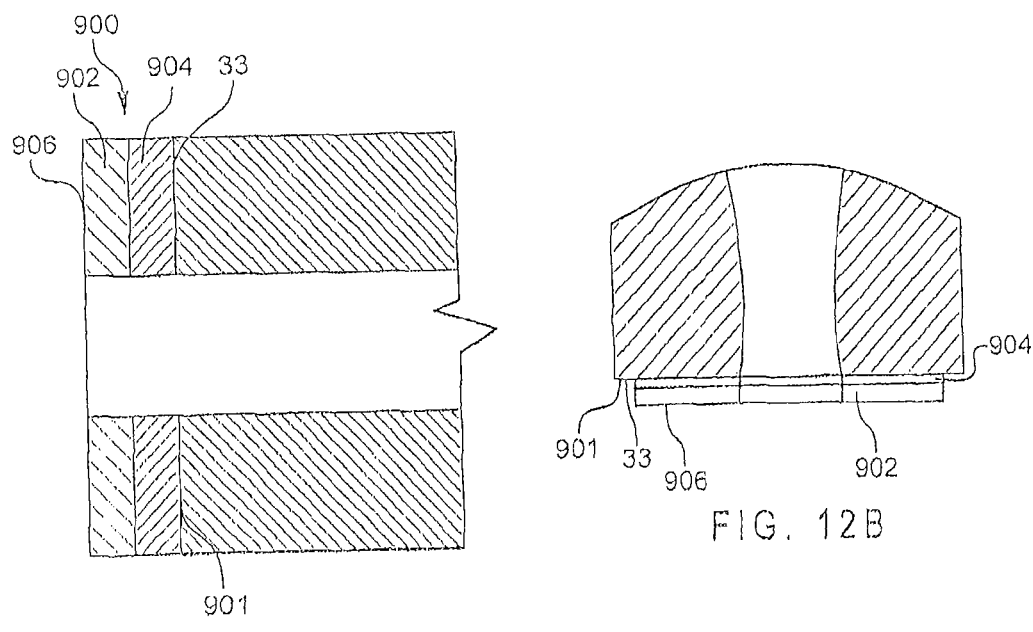
FIG. 12A
FIG. 12B

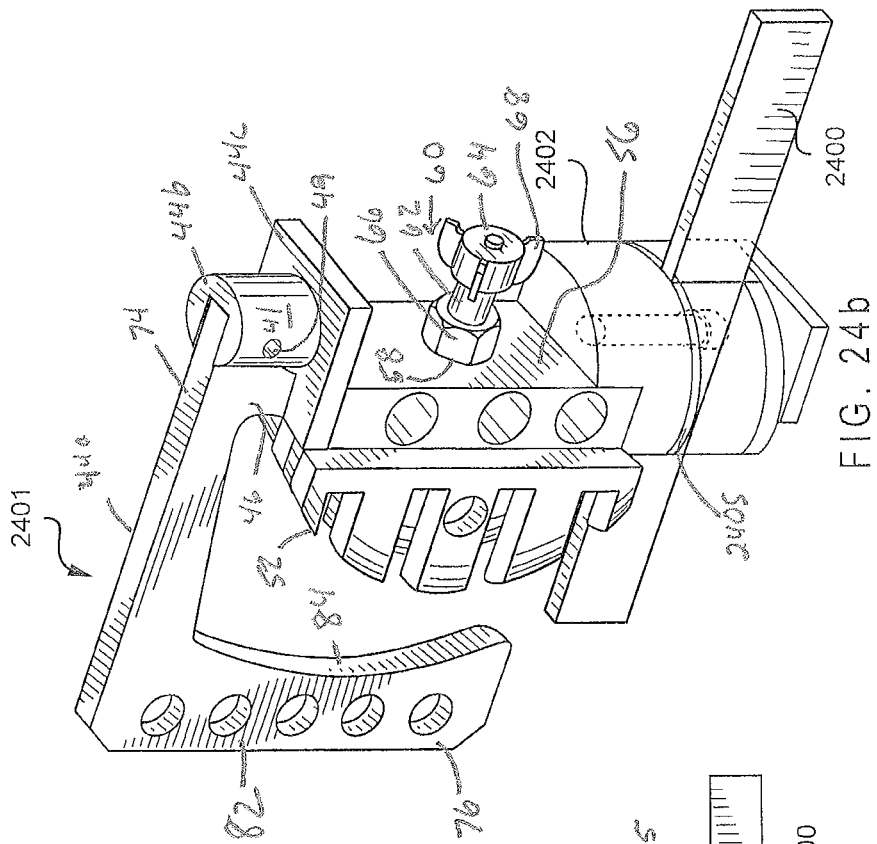
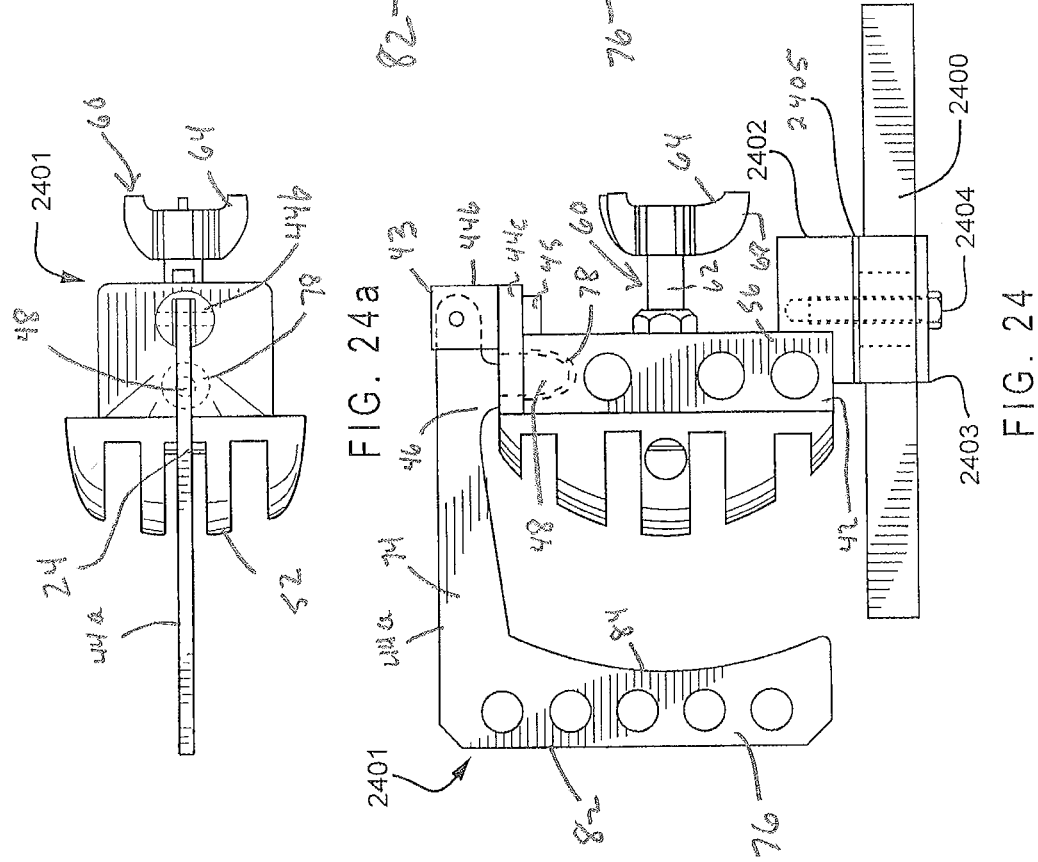

GAUGE FOR MEASURING A PORTION OF A RAILCAR ARTICULATED CONNECTOR

RELATED APPLICATIONS

The present application claims priority to U.S. Provisional Application No. 61/590,675, filed Jan. 25, 2012 and entitled "Reconditioning of Articulated Connector Load Bearing Bottom Surfaces," the entire disclosure of which is herein incorporated by reference.

BACKGROUND

Multi-unit railroad cars are typically interconnected using couplings, such as articulated connectors, to link one unit to the next. Most often, the connectors include a male casting portion mounted to the end structure of one of the rail car units which is joined to a female casting portion located on the end structure of the adjacent rail car unit. Joining of the male and female portions results in an articulated connection between the rail car units. American Steel Foundries, Inc. (ASF) of Granite City, Ill. and Meridian Rail, Inc. (formerly and hereinafter National Castings) of Lombard, Ill. manufacture the most frequently used connectors of this type in the U.S. industry.

The cargo portion of a railroad train comprises a plurality of multi-unit rail cars linked in this fashion. As such, the driving locomotive is only acting directly on the car adjacent to it, which is then joined to the next unit, etc. The pulling, or pushing, of the rail car units by the locomotive creates a significant level of stress on each connector as each bears the entire force of the rest of the rail cars. Any contact between the male and female casting portions and their associated components results in wear on those contact areas of the connectors.

The stress placed on the connectors results in wearing of the metal at several points of contact between the male and female portions of the connectors, or their respective components, due to impact and frictional contact. Particular points of wear include the bottom ring surface and anterior surfaces of the bores of the female portion of the connector, and the bottom bearing surface, the spherical anterior surface of the opening 32 (as shown in FIG. 1) and the front spherical surface of the male portion of the connector. Commonly owned U.S. Pat. Nos. 7,490,393 and 6,944,925 describe processes for reconditioning the front surface 30 of the male portion of the connector and the front surfaces of the bores of the female portion of the connector as well as the anterior surfaces of the bores of the female portion of the connector.

As articulated connector castings are an integral part of the car structure and are difficult and expensive components to replace, it is favorable to repair or recondition the connectors as opposed to replacing them or the entire rail car. Connector castings can commonly travel 1,200,000 miles or more without the need for significant maintenance. In the past, reconditioning of most rail car components has involved removing various parts from the rail car and reapplying them back into place after such reconditioning. Some couplers have been reconditioned in this way, especially those removable by design. Articulated connectors, however, are not suited for such removal and repair since they are integral to the car and such repair would be inefficient, time consuming, and expensive.

It is therefore an object of the present invention to provide a method of reconditioning rail car connectors such that the reconditioning occurs while the castings are still attached to the rail cars. It is a further object of this invention to simplify the measurement of portions of the connectors ensuring that the connectors are reconditioned to the appropriate dimensions, including the use of appropriate gauges. It is yet a further object of this invention to provide a method of reconditioning rail car connectors utilizing gauges to take the measurements of the connectors while still attached to the rail car. It is still another object of this invention to provide a method for reconditioning rail car connectors using less labor-intensive processes by eliminating the need to invert a rail car in order to perform reconditioning of the connectors, although the process can be used on inverted rail cars as well

BRIEF SUMMARY

In a first embodiment, an apparatus for measuring a portion on an articulated connector relative to a reference portion of said connector is provided. The apparatus comprises a fixable base mountable to the connector against the reference portion of the connector, an arm pivotally mounted to the base and extendable toward the portion of the connector, the arm having a measurement portion, the measurement portion movable across at least a section of the portion of the connector, and a rotating component connected to a mounting piece.

BRIEF DESCRIPTION OF THE DRAWINGS

FIG. 12 is a view of the bottom of a male casting that includes a wear plate;

FIG. 12A is a sectional view along line A-A of FIG. 12 showing a male casting that includes a wear plate;

FIG. 12B is an alternative sectional view along line A-A of FIG. 12 showing a male casting that includes a wear plate;

FIGS. 24, 24a, 24b and 24c illustrate a gauge for use with the present method;

DETAILED DESCRIPTION OF THE DRAWINGS AND THE PRESENTLY PREFERRED EMBODIMENTS

Figure 1:
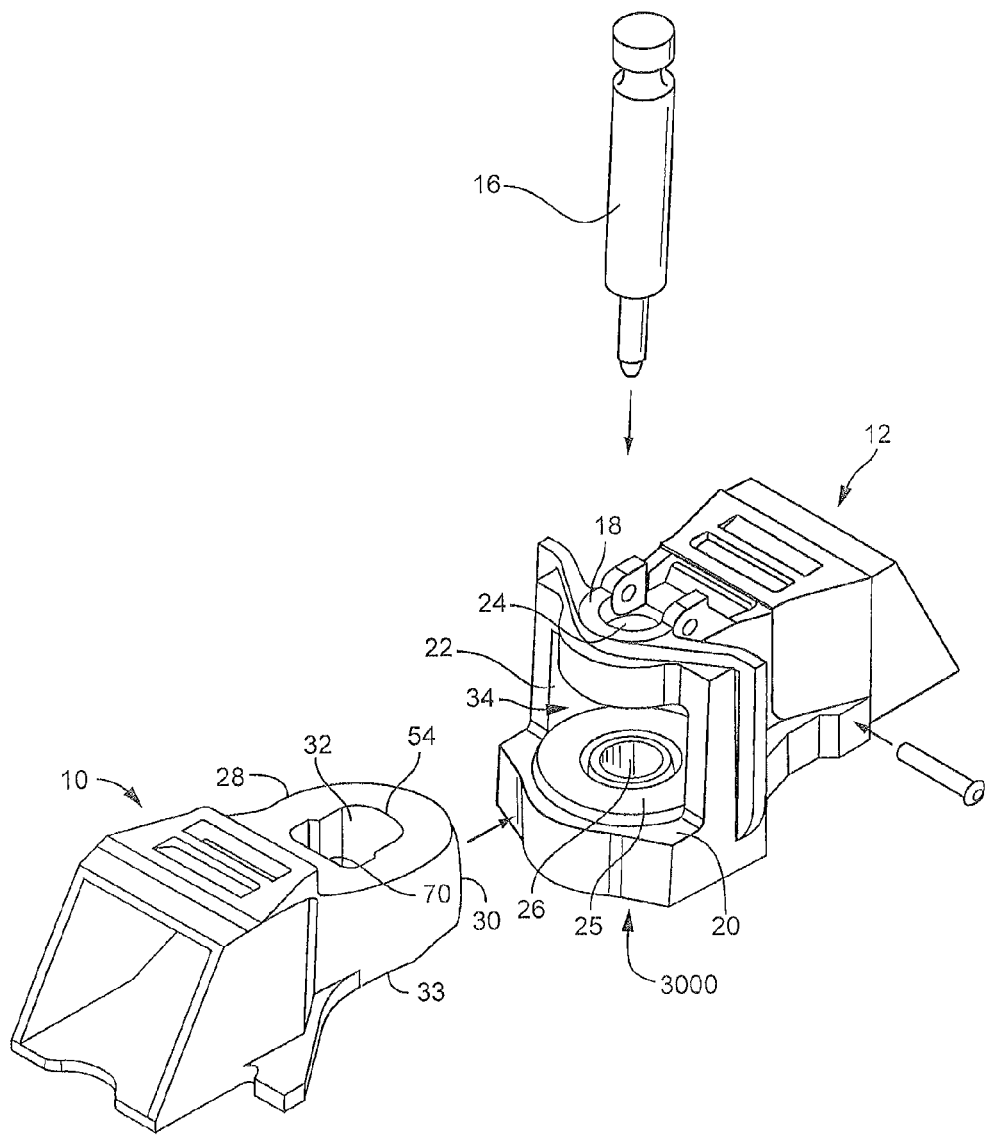
FIG. 1 is a perspective view of male and female casting portions of an unassembled connector.
Figure 2:
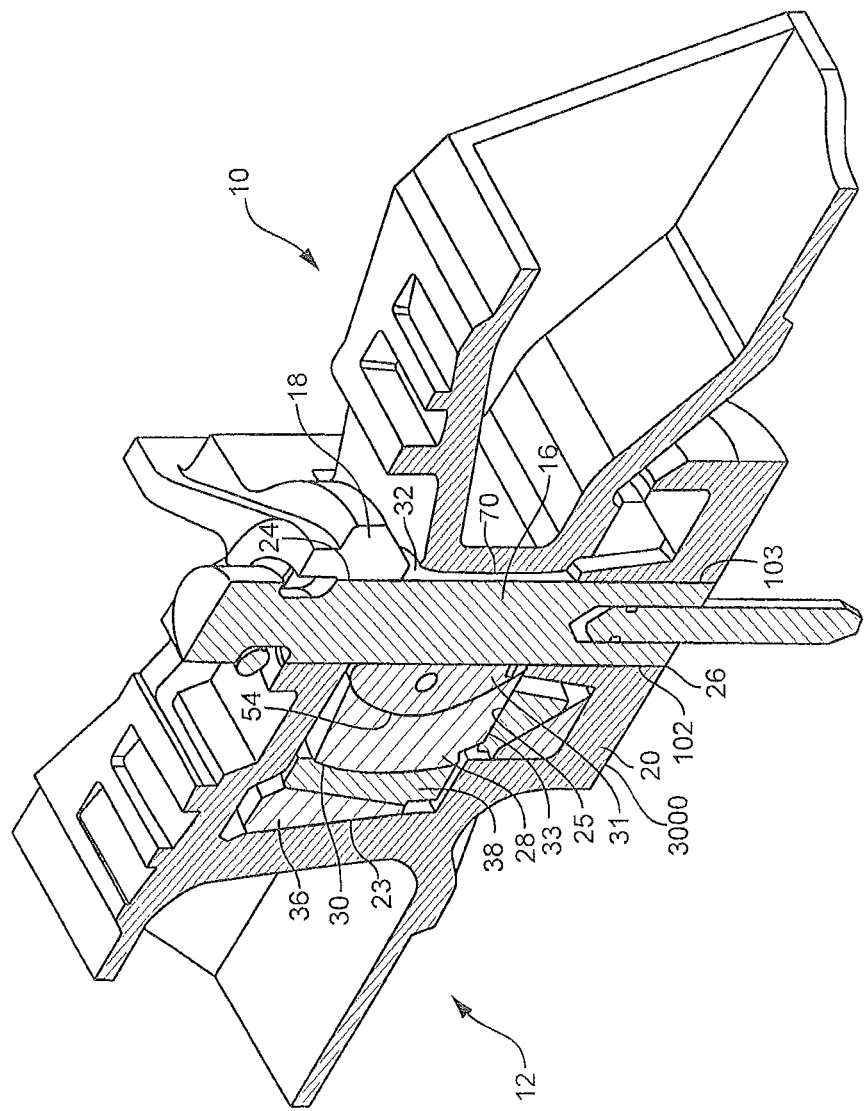
FIG. 2 is a perspective cross-section view of an unassembled connector.

Referring to FIGS. 1-2 generally, the articulated connector castings being reconditioned are attached to the rail car end structure (not shown) and usually include a male casting 10 located on one rail car unit and a female casting 12 located on the adjacent rail car unit such that the male and female castings can interlock, joining the rail car units to form a multi-unit rail car. When the female and male castings are brought together, bores 24, 26 of the female casting are aligned with the male casting opening 32 such that a pin 16 can be inserted, securing the male and female castings and their internal components together to complete the connector. The connectors are articulated such that they can rotate about the pin and have vertical angularity, allowing the rail car units to pivot relative to each other during movement around curved tracks and over undulating terrain.

As noted above, there are two dominant articulated connector types used in joining rail car units, namely ASF connectors and National Castings connectors, although other connector types exist which can be similarly accommodated by this invention. The following description refers to the ASF connectors. However, this description is exemplary of rail car connectors generally. As such, the following description of the invention is tailored to industry standards, but the invention could be modified to accommodate specific connectors used, including but not limited to National Castings connectors.

The exemplary ASF connector, as shown in FIGS. 1 and 2, comprises a male casting 10 and a female casting 12. The female casting 12 is generally U-shaped in cross section to receive the male casting 10. The female casting 12 includes a top portion 18 and a bottom portion 20, which are generally planar and are joined by sidewalls 22 and a generally concave back wall 23. The sidewalls 22, back wall 23, top portion 18 and bottom portion 20 define the generally U-shaped receiving cavity 34 of the female casting. Both the top portion 18 and the bottom portion 20 of the female casting include a cylindrical bore 24 and 26, respectively, which are aligned with one another. Moreover, the bottom portion 20 includes a spherical ring surface 25.

The female casting additionally includes a wedge system located along the concave back wall 23. The wedge system includes a wedge 36 and a follower block 38. The follower block 38 is designed to conform to the spherical contour of the portion of the male casting with which it contacts. The wedge is then placed between the back wall 23 and the follower block 38, holding the follower block 38 in place and providing pressure. The wedge is held in place by gravity and drops as wear occurs within the system to maintain a low longitudinal slack condition, thereby keeping the follower block 38 in constant contact and compression with the male casting 10.

The male casting 10 includes a forward end 28, which is a generally U-shaped projection of generally constant thickness. The male casting 10 has an opening 32 with generally square features at the side nearest the attaching car unit, or posterior surface 70 of the opening 32, and with a U-shaped concave surface nearest the opposite, anterior surface 54 of the opening. The male opening 32 is different in shape than the female bores 24 and 26 as the anterior surface 54 of the male opening 32 is concave and generally spherical in shape and the opening 32 has an overall greater volume than that required for insertion of the pin. As such, a pin bearing block 31 is inserted into the opening 32 and mates with the anterior surface 54 of the opening, as shown in FIG. 2. The shape of the pin bearing block 31 is generally spherical along the end contacting the anterior surface 54 of the opening 32, to compliment the opening, and has a generally vertical concave cylindrical shape along the opposite side to receive the pin 16. When the pin bearing block 31 is placed in the opening 32, the concave cylindrical side of the pin bearing block 31 and the posterior end 70 of the opening 32 define the area to receive the pin as described below.

The forward end 28 of the male casting is generally U-shaped to compliment the interior of the female casting in shape. The forward end 28 includes a front surface 30 at the far end of the male casting which includes the generally U-shaped area. The front surface 30 is the portion of the male casting in contact with the follower block 38 when the male casting 10 is inserted into the female casting 12. The forward end 28 of the male casting also includes a bottom bearing surface 33. The bottom bearing surface 33 comes into contact with the spherical ring surface 25 when the male casting 10 is inserted into the female casting 12.

Upon assembly, as shown in cross-section in FIG. 2, the male casting 10, specifically the forward end 28 is inserted into the cavity 34 of the female casting 12. The bottom bearing surface 33 of the male casting is positioned above the spherical ring surface 25 such that the opening 32 in the male casting is aligned with the bores 24 and 26 of the female casting. When the two bores 24, 26 are aligned with the opening 32, a cylindrical pin 16 can be inserted through them. The pin 16 is inserted into the bore 24 in the top portion 18 of the female casting and then passes through the opening 32 in the male casting 10, which includes the pin bearing block 31, and then passes further to engage the bore 26 in the bottom portion 20 of the female casting 12. The top of the pin is preferably secured to the top of the female casting.

The wedge system works to eliminate slack from the connector system by applying pressure on the male casting and hence on the pin bearing block cylindrical surface bores and pin. Due to the wedge system and the general construction of the castings, significant wear occurs in selective areas. On the female casting, wear may occur on the spherical ring surface 25 and the anterior surfaces 103 of the female bores 24 and 26 as the compressive forces from pulling cars pushes the pin 16 against those surfaces. Conversely, the posterior surfaces 102 of the female bores receive negligible wear, as a result of the wedge system not allowing pin stress on this surface. On the male casting, wear occurs along the bottom bearing surface 33 and the spherical anterior surface 54 of the opening 32 as the pin bearing block 31 rides against it. Conversely, the posterior surface 70 of the male opening 32 receives no wear under normal operating conditions. The male casting also experiences significant wear on the front spherical surface 30 as a result of contact with the follower block 38 and compressive forces from other rail car units.

During use of connected rail car units, wear can occur in at least these areas as specified above due to friction caused by the pivoting and movement of the rail car units relative to one another. The following are methods for reconditioning and repairing rail cars at these common sites of wear either while the connectors are still attached to the rail car or when the connectors have been detached. The reconditioning returns the worn parts of the connectors back to their proper dimensions to ensure peak performance upon re-connection of the rail car units.

Manual Reconditioning of the Articulated Connector

Several methods are described herein to recondition articulated connectors. While ASF male castings are referenced below, as known to those of ordinary skill in the art, the methods and equipment described below may readily be adapted to be applied to other types of male castings, such as, for example, from National Castings, as well as to female castings. For example, the process described below could be applied to the bottom surface 3000 of the female casting 12 show in FIGS. 1 and 2.

The male castings should be prepared so that an accurate measurement can be taken to determine if reconditioning is required, particularly with respect to the areas described above. Such preparation includes cleaning the surfaces of rust, dirt, grit, grease, lubrication residue, or the like. Substances such as grease, grime and lubricants can be scraped from the surfaces. Remaining contaminants can be burned off with a torch or ground away. Metal upsets on the surfaces in need of reconditioning should be carefully machined smooth to prevent cold laps during later welding. The male castings are then measured to determine if reconditioning is required. Any portion of the casting that exists before the weld is applied can be referred to as being "parent casting material."

As noted above, the bottom bearing surface 33 and front surface 30 of the male opening 32 of the male casting are prone to wear as they are in frictional contact with the spherical ring surface 25 and follower block 38 respectively. The reconditioning of the bottom bearing surface is discussed below. As to the front surface 30, an example of reconditioning techniques may be found in U.S. Pat. No. 7,059,062, assigned to TTX Company, which is herein incorporated by reference in its entirety.

Figure 3:
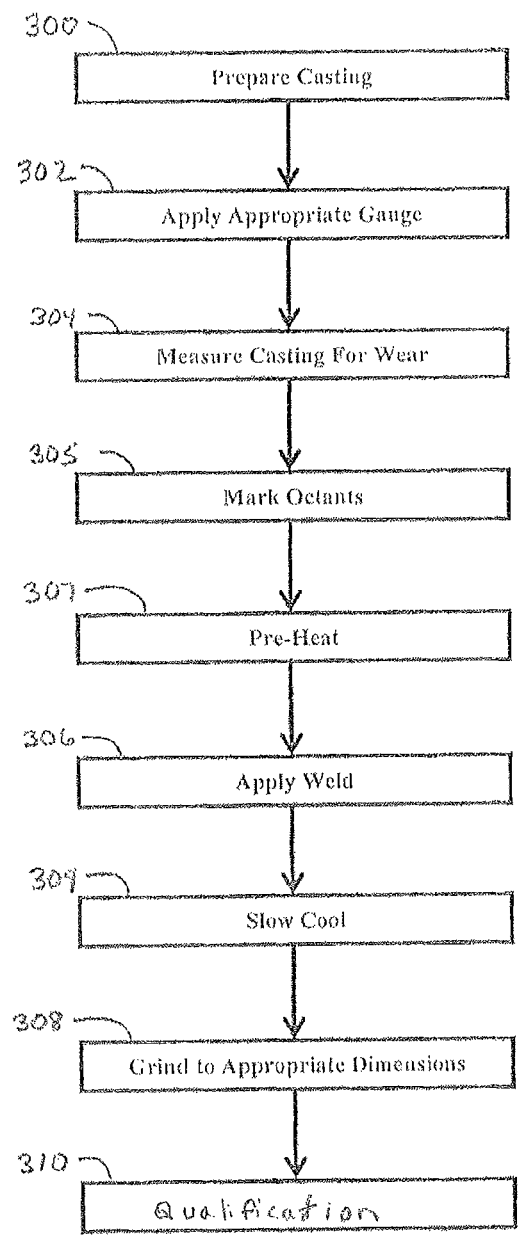
FIG. 3 is a flow chart of the process for manually reconditioning a connector casting.

FIG. 3 generally shows the steps of the applicable reconditioning process. Once the area to be measured has been prepared and cleaned 300, the bottom bearing surface 33 of the male casting 10 is measured 302, 304 to determine if the bottom bearing surface 33 has worn such that it needs reconditioning. Any suitable gauge may be used so long as it may be swept along the bottom bearing surface to determine if reconditioning should be performed.

Figure 24C:
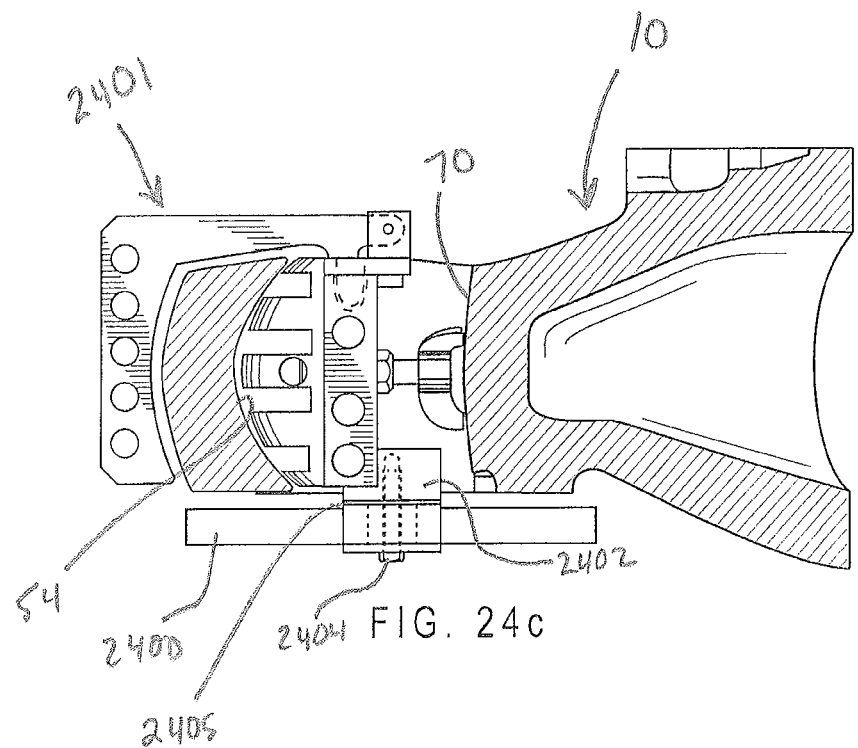

An exemplary gauge based on the gauge disclosed in U.S. Pat. No. 6,944,925 is shown in FIGS. 24, 24a and 24b. The preferred gauge 2401, as shown in FIGS. 24, 24a, 24b and 24c, for use in measuring the ASF male connector is a pivot gauge, which preferably includes two members: a base 42 and a swing arm assembly 44. The base 42 is generally a block-shaped member having a plurality of sides as shown. The top of the base 42 includes an opening 78 to receive a portion of the swing arm assembly 44. The front side of the base 42 has a relatively spherical surface 52 to engage the anterior surface 54 of the bore 32 in the male casting 10, which has a complimentary shape. The complimentary shapes allow the proper vertical relationship of the gauge to the male casting to ensure accurate measurement of the worn portion. The rear side 56 of the base preferably includes an opening 58 to receive a screw jack assembly 60. The screw jack assembly 60 includes a threaded rod 62 having a brace end 64 and a nut 66, forming an expanding clamp brace. The brace end 64 is configured to brace or secure the base 42 against the interior of the male bore 32. Preferably, the brace end 64 has three legs 68 contacting the posterior surface 70 of the male bore 32. The nut 66, when turned, extends or retracts the brace end 64 from the base 42. As a result, the turning of the nut 66 can extend the brace until it is flush with the posterior surface 70 of the male bore 32 securing the base 42 of the pivot gauge in the male bore 32. The anterior surface 54 and posterior surface 70 are typically unworn or minimally worn portions of the bore 32 that are sufficient for reference measurement for refinishing.

The swing arm assembly 44 comprises a swing arm 44a, a cylindrical holder 44b, and a plate 44c. The swing arm 44a is generally L-shaped, and includes an extension arm portion 74 and a measurement arm portion 76. The length of the extension arm 74 is determined by the dimensions of the male casting generally, including the contact surface 30 and the male bore 32.

The swing arm assembly 44 is pivotally connected to the base. Plate 44c is secured to the base 42 by a countersink bolt 48 located on the plate 44c. The countersink bolt 48 is received in opening 78 in the base 42. The cylindrical holder 44b, which preferably has a top portion 43 and a bottom portion 45, is then pivotally attached to the plate 44c. The bottom portion 45 of the cylindrical holder 41 is preferably inserted into a hole (not shown) in plate 44c and is secured to the plate, preferably with a c-shaped clip (not shown) inserted into and around a smaller diameter of a groove in the bottom portion 43 of the cylindrical holder 41.

The top portion 43 of the cylindrical holder 41 includes a notch 47 to receive the extension arm 74 of the swing arm 44a. Additionally, an inline hole 49 extends horizontally through the cylindrical holder 41 which aligns with a similar hole (not shown) in the extension arm. A pin can then be inserted through the hole 49 and the hole in the extension arm 74, securing the extension arm 74 to the cylindrical holder 41.

The swing arm assembly results in the plate 44c being secured to the base 42 via countersink bolt 48, the cylindrical holder 44b being removably and pivotally secured to the plate 44c, and the swing arm 44a being removably and pivotally secured to the cylindrical holder 44b. The swing arm 44a is thus capable of pivoting generally vertically up from the base around the inline hole 49 and pin. This allows the swing arm 44a to be pivoted up and away from the male casting 10, when desired. The cylindrical holder 44b and hence the swing arm 44a are additionally able to pivot horizontally around the axis of the cylindrical holder 44b, allowing the swing arm 44a and its contour edge 84 to sweep along a desired range of the male casting contact surface 30.

The swing arm 44a additionally includes a flat portion 46, which is part of the extension arm 74 that contacts the plate 44c and ensures the proper relationship between the contour edge 84 and the spherical surface 52 of the base 42. The measurement arm 76 then extends downwardly from the extension arm 74. The measurement arm 76 includes a front edge 82 and a contoured edge 84. The curve of the contour edge 84 is designed to conform in shape with the contact surface 30 of the male casting 10 of the connector. The contoured edge 84 can swing the entire range of the contact surface 30 of the male casting 10. The length of the extension arm 74 is such that the contour edge 84 of the swing arm 44a is less than approximately 1/8" from the contact surface 30 of a male casting 10 having no wear.

The preferred gauge 2401 of the present invention also includes a rotating component 2400 attached to a mounting piece 2402 that includes a bolt 2404, a bushing 2403 and a spacer 2405. The gauge 2401 is shown in position in FIG. 24c. Once the gauge 2401 is locked in place as described above, the rotating component 2400 is rotated around to measure the amount of weld that needs to be built up, or, if the rotating component is removed and flipped over, is used to measure whether the surface 33 needs further grinding to get back to the proper dimension.

Figure 25:
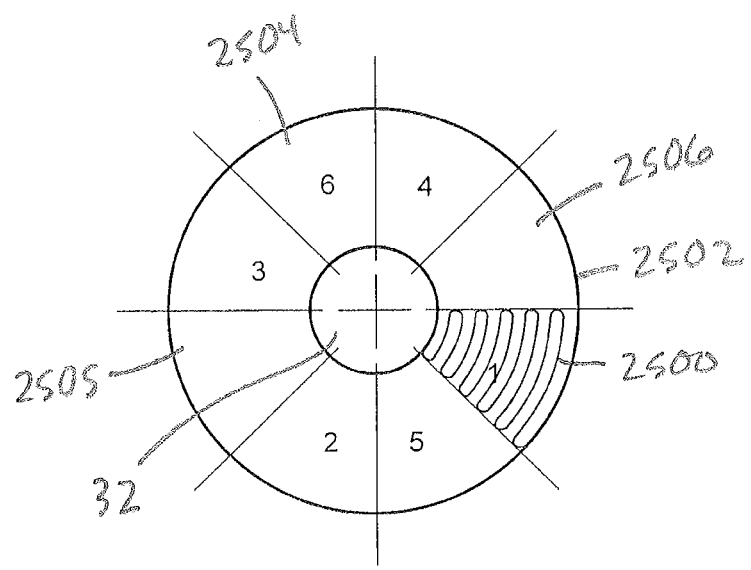
FIG. 25 is a bottom view of a connector casting illustrating a division into octants and an example of a weld pattern.
Figure 26:
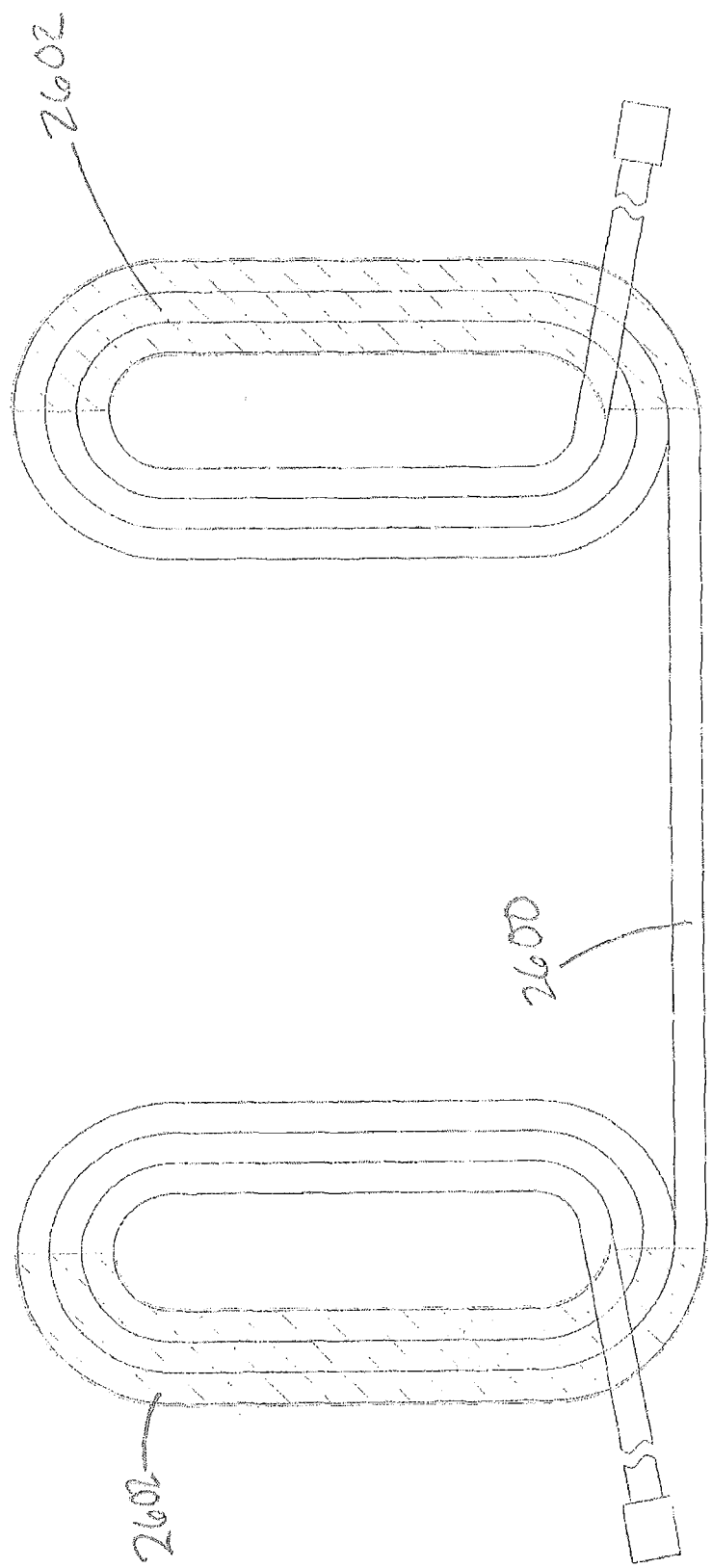
FIG. 26 is a top view of a wound induction heating induction cable.
Figure 27:
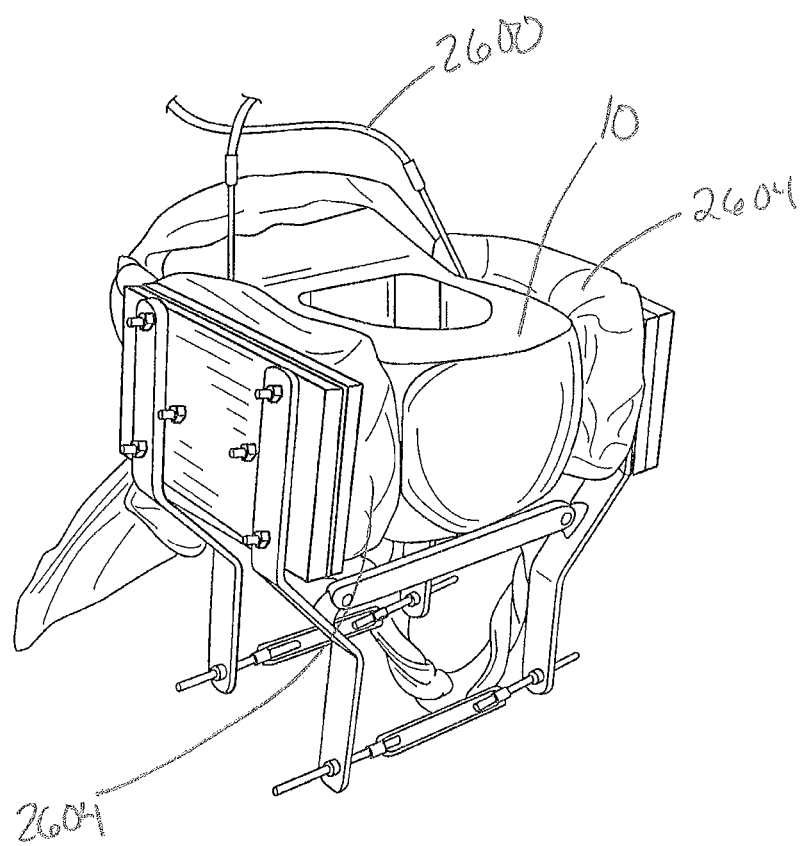
FIG. 27 is a perspective view of a male portion of an articulated connector with saddlebags in place holding the induction heating cable of FIG. 26.

Once it is determined that the male casting 10 of the connector requires reconditioning (i.e., FIG. 3, 302, 304), the bottom bearing surface 33 is divided into octants (step 305) and marked using a soap stone as shown in FIG. 25. Next, the bottom bearing surface 33 and the surrounding areas are preheated 307 to between 300-500° F. and maintained at this temperature range during the welding process, for example by use of a torch with a heating tip. It is preferable to use a non-contact thermometer to identify that the preheat temperature is within the desired range. Alternatively, the male casting 10 may be heated using an induction heating cable to automatically preheat the casting and maintain the casting at the desired temperature during welding. Induction heating may also be used to control slow cooling during the process. Referring to FIGS. 26 and 27, an exemplary embodiment of an induction heating cable 2600 and its application to a male casting 10 is shown. The induction heating cable 2600 is typically controlled by a commercially available induction heating system, such as a Miller Proheat™ 35 Induction Heating System, although other induction heating systems may be used. In operation, the induction heating cable 2600 is wound into circular, oval shapes 2602 having a minimum of two full windings as shown in FIG. 26. The cable 2600 windings may consist of a single layer or multiple layers, as required to produce the required casting temperature during the reconditioning process.

In the male casting 10 reconditioning process, there are preferably at least two of these oval shaped cable windings 2602, which are symmetrically spaced from the approximate midpoint of the induction heating cable. These oval shaped windings 2602 are applied symmetrically to each side of the male casting 10 as shown in FIG. 27. The windings 2602 are shown in insulating saddle bags 2604 in the illustrations, but any insulating material may be used between the cable windings 2602 and the male casting 10 surface to separate the windings 2602 from direct contact with the male casting 10 in order to prevent heat damage to the induction heating cable 2600.

The affected area is then built up with weld 306 one octant at a time, preferably using a specially modified Stoody hard facing welding wire (0.045" diameter for example, although other diameters may be used) to allow overhead welding and use of $CO_2$ gas. An equivalent wire having similar chemistry and welding characteristics may also be used. The chart below provides exemplary wire compositions and machine settings, but other compositions will be evident to those skilled in the art:

| Wire | Required Gas | Welding Position | Volts | Amps | Feed Rate (ipm) |
| --- | --- | --- | --- | --- | --- |
| Stoody (0.045" dia.) | $CO_2$ or 75% Ar/25% $CO_2$ | Horizontal | 27 | 210 | 330-370 |
| Stoody (0.045" dia.) | $CO_2$ or 75% Ar/25% $CO_2$ | Flat (Downhand) | 28 | 220 | 385-425 |
| Stoody (0.045" dia.) | $CO_2$ or 75% Ar/25% $CO_2$ | Overhead | 27 | 160 | 245-285 |

As shown in FIG. 25, a weld bead 2500 is preferably applied along each soap stone marking making up the octants from the center hole 32 to the outside edge 2502 of the casting. Then, beginning at the outside edge 2502, weld 2500 is applied radially moving inward until the entire octant 2504 is welded. The weld may also begin on the inside edge of the casting and be applied moving radially outward until the entire octant 2504 is welded. Weld is applied to the octants 2504 in the order shown by numbers 1-6 in FIG. 25, leaving two diagonally opposite octants 2505, 2506 unwelded. After the first six octants 2504 are welded the rotating component 2400 is removed and the remaining two may be welded.

Optionally, and as a precaution, the surfaces of the gauge 2401 shown in FIGS. 24a, 24b and 24c subject to weld spatter should be lightly coated with a spatter resistant product prior to welding. Preferably, the application of weld to the worn surfaces should be performed in a relatively still air environment to prevent loss of shielding gas and fast cooling. The surface temperature of the casting should not be allowed to drop below 300° F. at any time during the build-up process. It may therefore, be necessary for the casting to be reheated during the process. If the welding process is interrupted for any significant length of time, the welded area must be thoroughly covered with an insulating blanket to prevent fast cooling and potential cracking of the weld.

Figure 20:
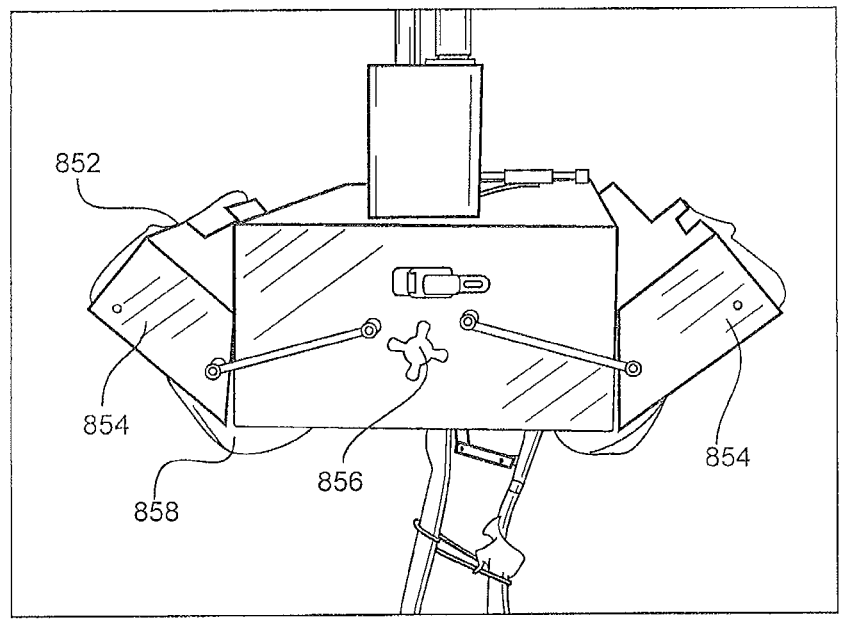
FIG. 20 is a view of an insulating box applied over a male casting while a torch assembly is applied.

Welding practices known in the art regarding the removal of all slag, oxide scale and spatter between passes should be followed. Weld should be finished so as to not produce a notch effect at the junction of the weld with the parent metal and every precaution should be taken to avoid abrupt changes in section thickness at the line of fusion. Following the welding process, the casting is slow cooled to ambient temperature using insulating blankets or an equivalent means such as an insulating box as shown in FIG. 20. Cracks, incomplete fusion, overlaps, undercut, unfilled craters, voids, and other defects can be highly problematic and should be avoided. The preheating and slow cooling steps during the process help reduce the potential for cracking. For porosity, no rounded indications greater than 3/16 inches long, and no 6 inch square regions containing ten or more rounded indications are preferred.

Following the slow cool, the insulating blankets are removed. The rotating component 2400 is then reapplied in an inverted position. The restored bottom bearing surface 33 then is manually ground 308 to within a desired tolerance of the rotating component 2400 blade surface. The desired standards will depend on machining and/or industry requirements, but in one preferred embodiment it is within 1/16 inch of nominal new dimension. Grinding generally involves the removal of excess weld, metal, or other material. The weld additionally is blended into existing adjacent surfaces.

Once welding 306 and grinding 308 are accomplished, the bottom bearing surface 33 is measured, such as by passing a gauge over the surface 33, to re-qualify the part 310 and ensure proper repair has occurred such that no wear or over buildup remains and that the dimensions are correct. If desired tolerances are not met, the bottom bearing surface should again be reconditioned as described above. Whether welding 306 and grinding 308 are both required will depend on the quality and remaining thickness of the weld. After cooling, the restored area is tested, such as through the use of dye penetrant or magnetic particle inspection, to determine that the quality of the restored surface is free of defects.

Advantageously, the above reconditioning method overcomes problems in the prior art. Notably, when male castings wear, they usually are removed and replaced. This is expensive and wastes materials. The above method avoids this drawback. Furthermore, the octant method as described reduces surface cracks such as radial cracks in the weld material.

With respect to the application of this process to a female bottom surface 3000, the general principle of building the surface up with a weld material and then grinding (or machining the surface in a semi-automatic process as described below) also applies.

Semi-Automatic Process for Reconditioning Connectors

A semi-automatic technique will now be described as implemented for the reconditioning of an ASF male articulated connector casting. It is contemplated that the presently preferred technique is applicable to other connector castings, such as male National Castings articulated connector castings, and the female casting counterparts thereof.

As described above and shown in FIGS. 1 and 2 in the present disclosure, the ASF male casting 10 includes a forward end 28 having a bottom bearing surface 33. The bottom bearing surface of the male casting is subject to wear caused by contact with the spherical ring surface 25 within the female casting 12 during use.

As noted in the description of the above method, reconditioning of the bottom bearing surface 33 on the male casting may be accomplished through the manual application of a grinding process once the surface has been rebuilt through welding. The grinding procedure, while more desirable over the known method of removing and replacing the entire casting, may take many hours to complete by hand due to the superior strength of the materials used in the casting and the weld. Moreover, given the length of the task, it is often advantageous to flip or invert the cars with the male casting, so that the bottom bearing surface is not being reconditioned upwardly. This may present challenges due to the large size and weight of the car and casting. Moreover, the manual reconditioning process usually requires the rail cars to be brought to a repair shop facility. It therefore may be desirable to automate the welding and metal removal process.

Figure 13A:
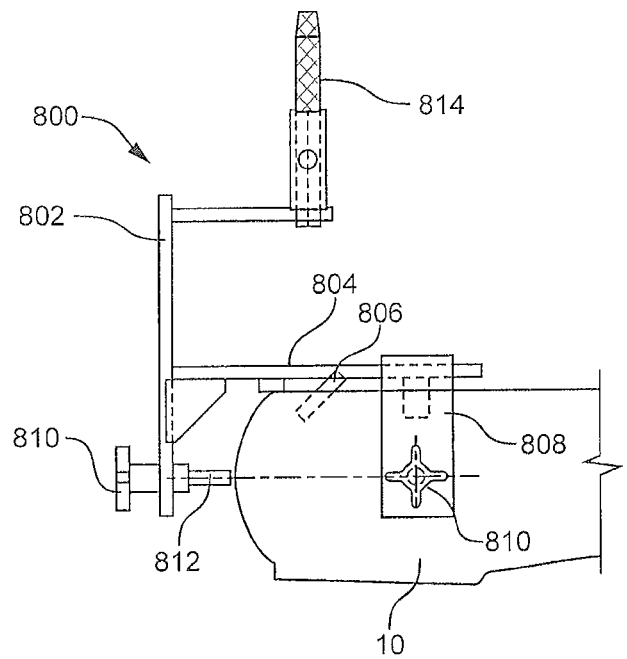
FIG. 13A is a side view of a welding fixture attached to a male casting (truncated)
Figure 13B:
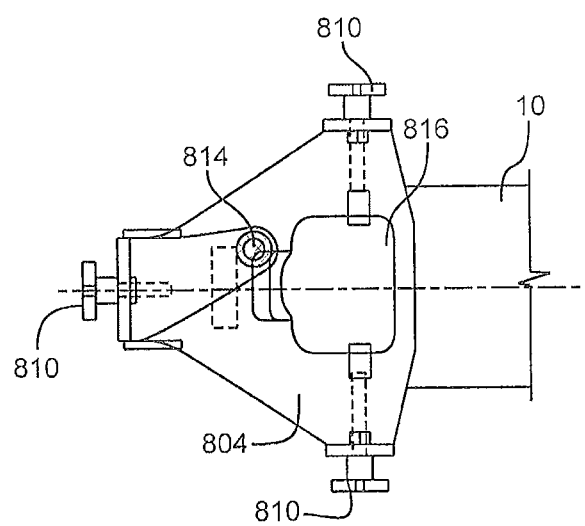
FIG. 13B is a top view of the welding fixture of FIG. 13A attached to a male casting (truncated)

In accordance with the present invention, a welding fixture 800 is provided to assist in semi-automatic reconditioning of an ASF male casting. Turning to FIGS. 13A-13B, the welding fixture includes a support plate 802 and a base plate 804 extending substantially perpendicular from the support plate 802. The base plate 804 includes a cutout 816 that, as explained below, allows a welding device to be connected with the welding fixture 800. It also includes a catch plate 806 that extends downwardly at an angle relative to the base plate. The catch plate 806 engages to an inner surface of the anterior surface 54 of the opening of the male casting 10 to secure the welding fixture 800 to the male casting. While the catch plate 806 can be angled as desired in order to secure the welding fixture to the male casting, in a preferred embodiment the catch is angled downwardly at approximately 54 degrees to the base plate.

A pair of side arms 808 extend downwardly from the base plate 804, such that a side arm 808 is on either side of the male casting 10 when the welding fixture 800 is attached to the casting. As explained further below, each of the support plate 802 and side arms 808 includes a knob 810 that, when tightened, allows a screw 812 associated with the knob to engage the male casting and secure the welding fixture 800 to the male casting 10. A fixture shaft 814 extends upwardly from the top plate. The fixture shaft provides for the attachment of a welding assembly to semi-automatically build up the weld on the bottom bearing surface of the male casting.

Figure 4A:
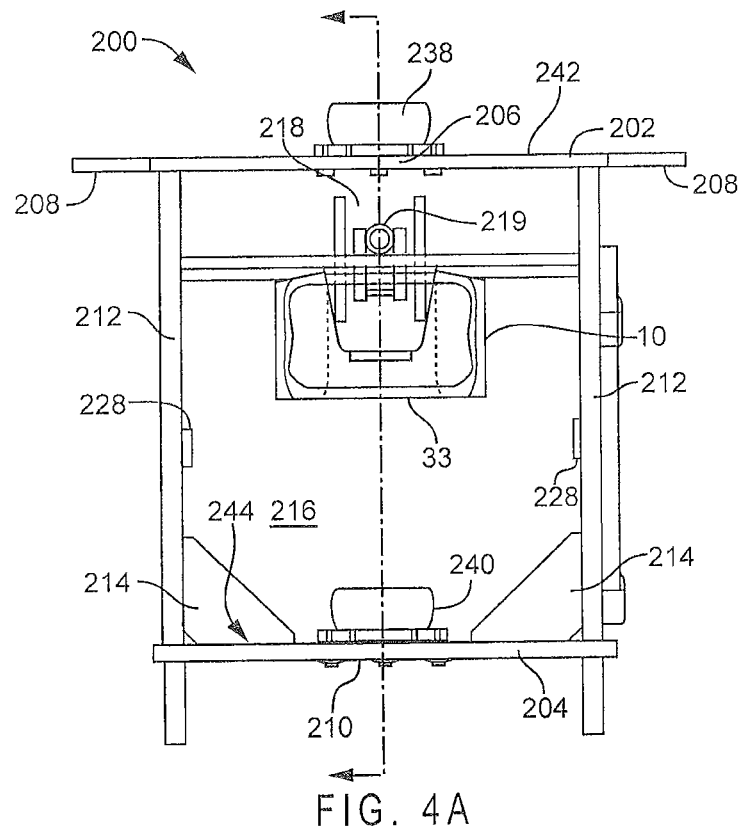
FIG. 4A is a front view of a machining fixture for reconditioning a connector that is mounted to a male connector portion.
Figure 4B:
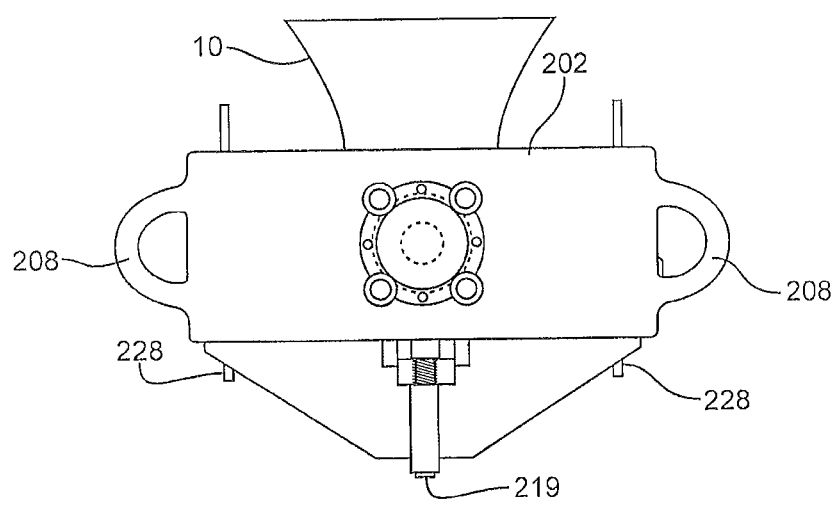
FIG. 4B is a top view of the fixture of FIG. 4A.

A machining fixture assembly 200 is also provided to assist in the semi-automatic reconditioning of an ASF male casting. After the welding step as described above, the male casting 10 is removed from the welding fixture 800 and placed and aligned in the machining fixture 200. Preferably, the fixture includes an adjustable, rigid frame apparatus as shown in FIGS. 4A-4H. Turning first to FIGS. 4A-4B, the fixture 200 includes a horizontally positioned top plate 202 and a corresponding horizontal bottom plate 204. The top plate 202 includes a first opening 206 and a pair of handles 208. The bottom plate 204 includes a second opening 210, which is substantially aligned with the first opening in the top plate 202. Preferably, and as shown in FIG. 4I, the first and second openings 206, 210 are aligned such that the measurements L1 and L2 are within approximately 1/32 inches of each other and where the measurements D1 and D2 are within approximately 1/16 inches of each other. However, in other embodiments other tolerances may be used.

The top and bottom plates 202, 204 are connected via a pair of spaced, vertical sideplates 212 rigidly attached to and extending between the top plate 202 and the bottom plate 204. Gussets 214 are mounted in various corners of the frame of the fixture 200 to reinforce the rigidity of the structure. In the rigid frame of the fixture 200, the horizontal plate 202 and 204 and the vertical sideplates 212 define an interior space 216. The fixture 200 also includes a centering portion 2000 with a tongue 4000 which acts as a guide to help center the fixture 200 laterally on the connector 10.

The fixture 200 incorporates a clamp assembly 218 to allow attachment of the fixture 200 to a male ASF casting. Preferably, the clamp assembly 218 includes a hook 220 and a threaded rod 219 that, as explained further below, allows the hook 220 to be moved in the direction of the arrows 222 in FIG. 4D. The clamp assembly 218 further includes an alignment plate 224 and at least one spacer 226 attached to the alignment plate 224, such that they are "stacked" in a horizontal direction (i.e., arrows 222). A pair of gauge support bars 228 are attached to the inner surfaces of the sideplates 212 and, as shown in FIG. 4B, they extend outwardly from the sideplates 212. As shown in FIG. 4J, the fixture 200 also includes a pair of holders 230 on one of the sideplates 212 to hold a gauge 232. As explained below, the gauge 232 is used in conjunction with the support bars 228 to check the bottom bearing surface 33 of the male casting. Referring to FIG. 4H, in a preferred embodiment it is desirable to have an upper surface 234 of the support bars 228 be approximately perpendicular to a surface 236 of the outermost spacer 226 to within 0.1 degrees, and to have the upper surfaces 234 of the support bars 228 be approximately parallel to each other to within 0.1 degrees.

First and second bearings 238, 240 are included and are centered within the first and second openings 206, 210. The first bearing 238 is disposed on a top side 242 of the top plate 202 and the second bearing 240 is disposed on a top side 244 of the bottom plate 204. The first and second bearings 238, 240 should be substantially aligned. One way of aligning the bearings is through the use of an alignment tube 246 (FIGS. 4F-4G). In one desired embodiment, the bearings may be aligned such that the vertical axis defined by $Y_1$ is parallel to axis defined by $Y_2$ to within 0.1 degrees and the vertical axis defined by $Y_3$ is perpendicular to horizontal axis defined by $X_1$ within 0.1 degrees.

Figure 4D:
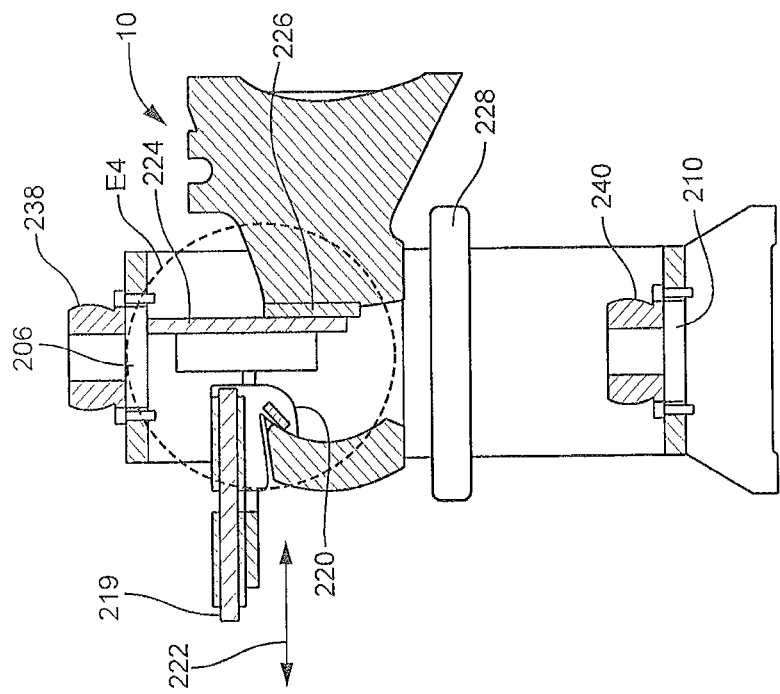
FIG. 4D is a sectional of the fixture of FIG. 4A that shows a clamping mechanism in a tightened position.
Figure 4C:
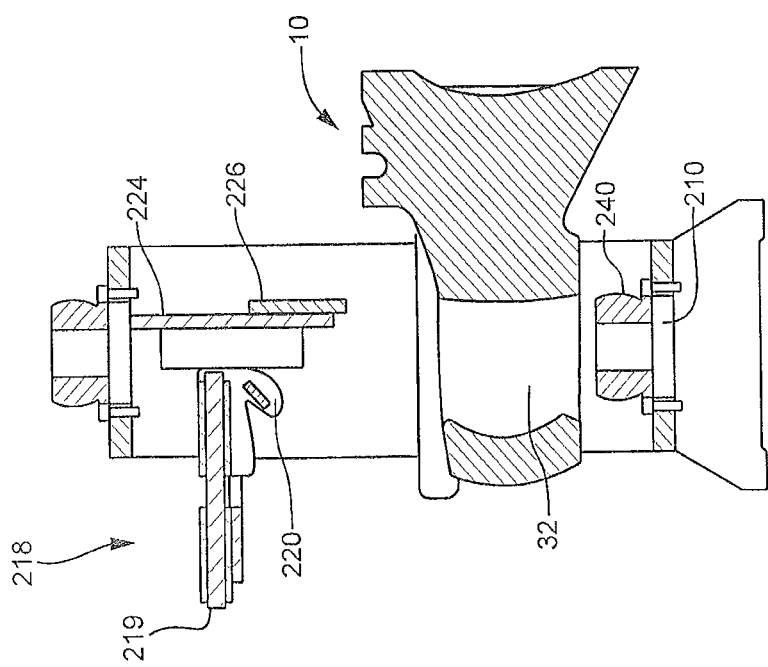
FIG. 4C is a sectional of the fixture of FIG. 4A that shows a clamping mechanism in a loosened position.
Figure 4F:
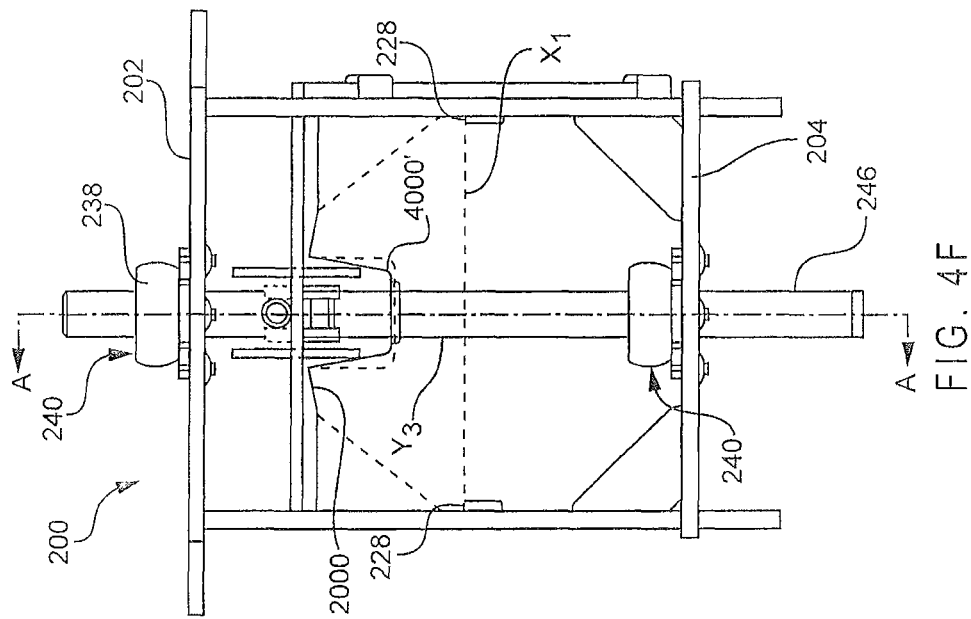
FIG. 4F is a front view of a machining fixture for reconditioning a male connector with an alignment tube installed.
Figure 4E:
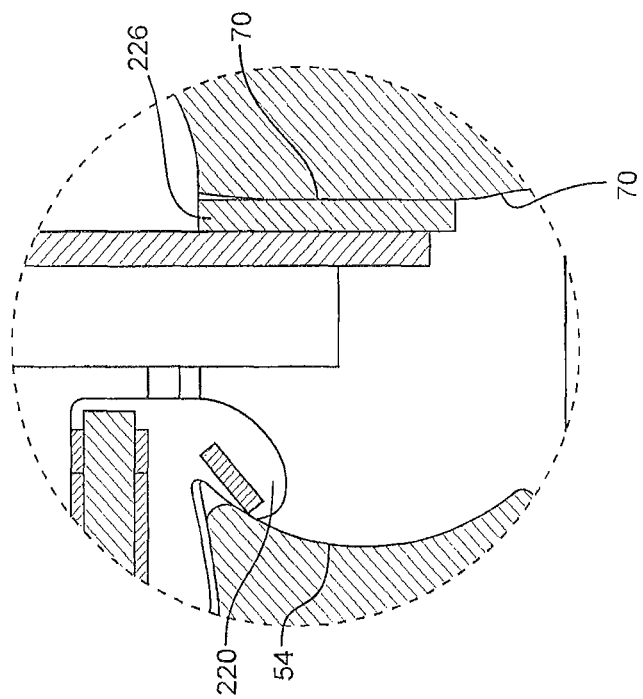
FIG. 4E is a blow up view of a portion of FIG. 4D.
Figure 4H:
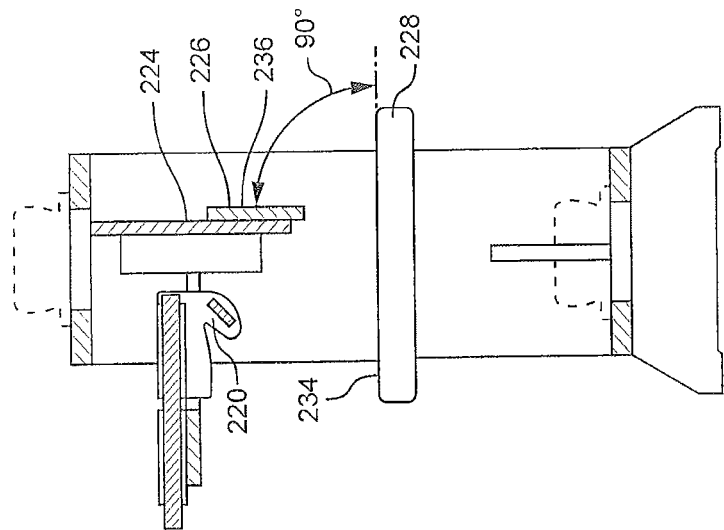
FIG. 4H is a sectional of a machining fixture for reconditioning a connector.
Figure 4G:
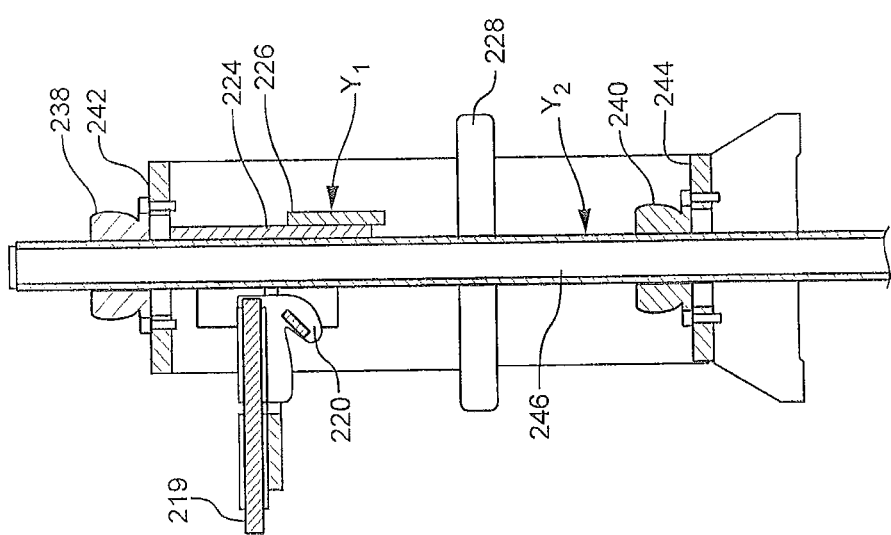
FIG. 4G is a sectional of the fixture of FIG. 4F taken along the line A-A.
Figure 4J:
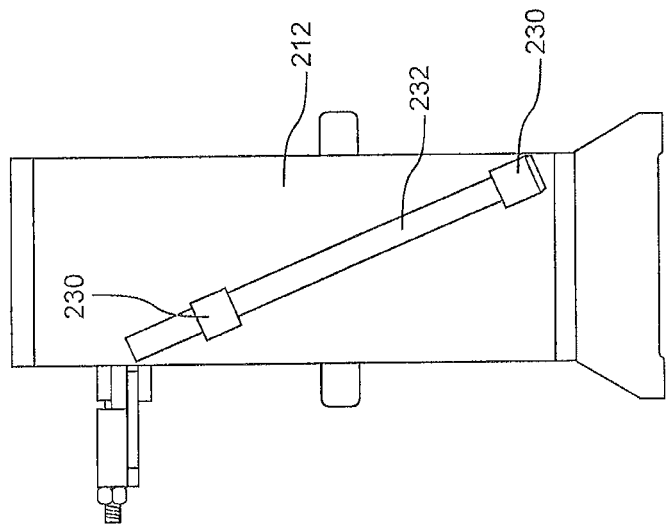
FIG. 4J is a right side view of the fixture of FIG. 4I.
Figure 4I:
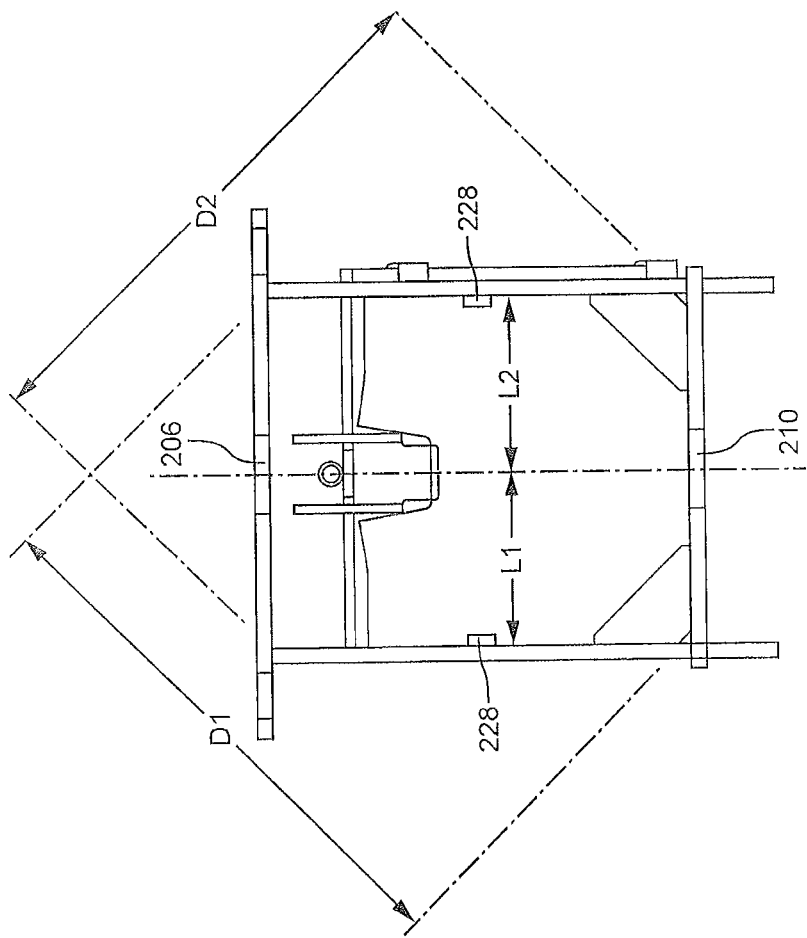
FIG. 4I is a front view of a machining fixture for reconditioning a connector.

FIGS. 4A-4E show an ASF male casting 10 attached to the fixture. In particular, FIG. 4C shows that the threaded rod 219 is loosened so that the hook 220 draws nearer to the alignment plate 224. This allows the clamp assembly 218 to be lowered into the opening 32 of the male casting 10. The threaded rod 219 is then tightened. Specifically, and as shown in FIGS. 4D-4E, the threaded rod 219 should be tightened so that the hook 220 and anterior opening surface 54 are in contact with each other and so that the outermost spacer 226 and posterior bore surface 70 are in contact with each other.

Figure 5:
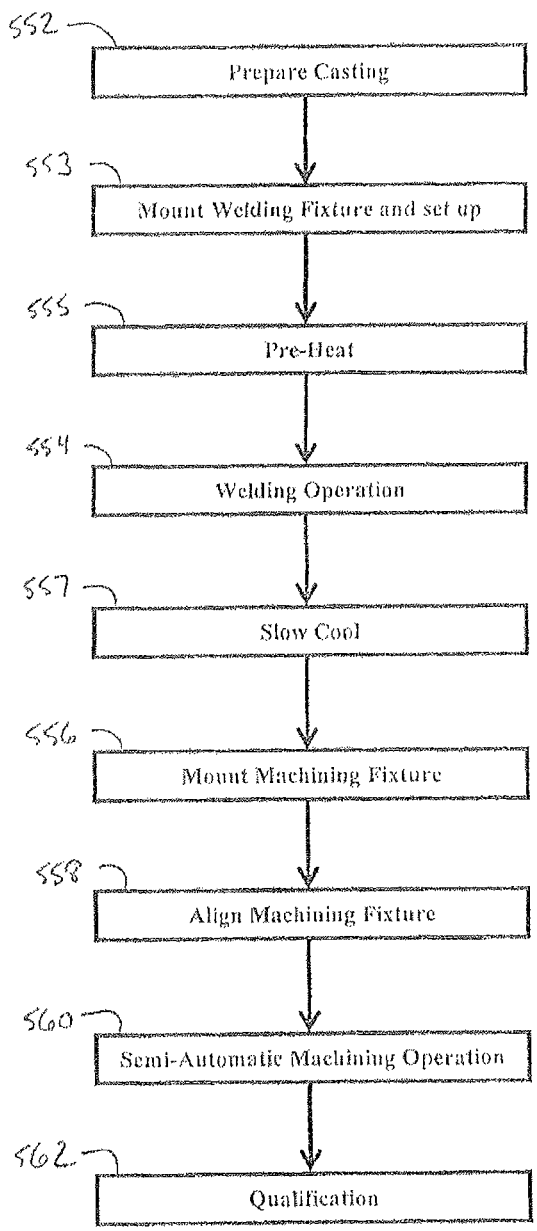
FIG. 5 is a flow chart of a semi-automated process for reconditioning a connector casting.

An exemplary embodiment of the semi-automatic reconditioning technique for the ASF male articulated connector casting will now be described. FIG. 5 illustrates a flow diagram of one embodiment of the preferred method. As shown at 552, the male casting of the ASF articulated connector 10 is prepared for reconditioning. This preparation is similar to that of the previously described embodiments above. In general, however, dirt, grease, lubrication residue, and other contamination must be removed from the bottom of the male bearing surface of the casting prior to the restoration procedure. Preferably, this is performed through burn off and/or machining (i.e. grinding). Burrs are then removed from the inner and outer diameters of the bottom bearing surface. The fixture 800 is mounted 553 to the casting 10 and the casting 10 is preheated 555 to between 300°-500° F.

Figure 14:
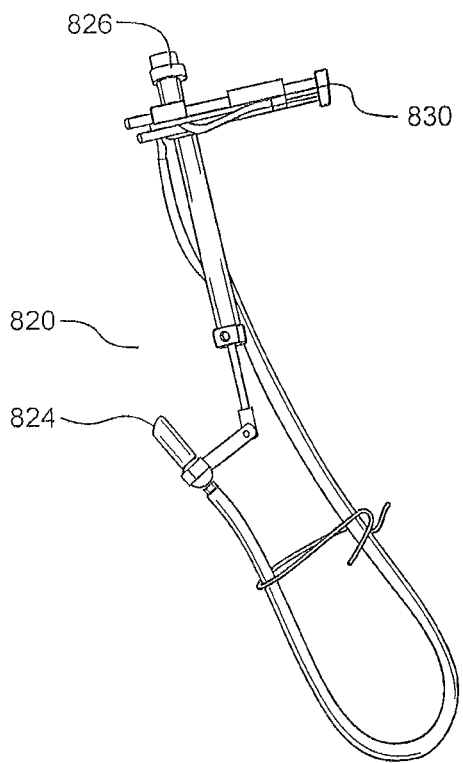
FIG. 14 is a view of a torch assembly.
Figure 15:
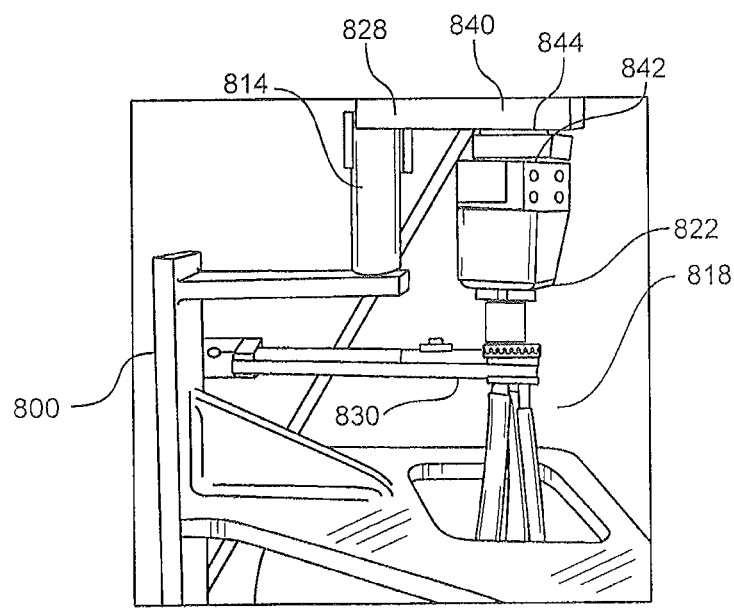
FIG. 15 is a view of a weld apparatus attached to a weld fixture.
Figure 16:
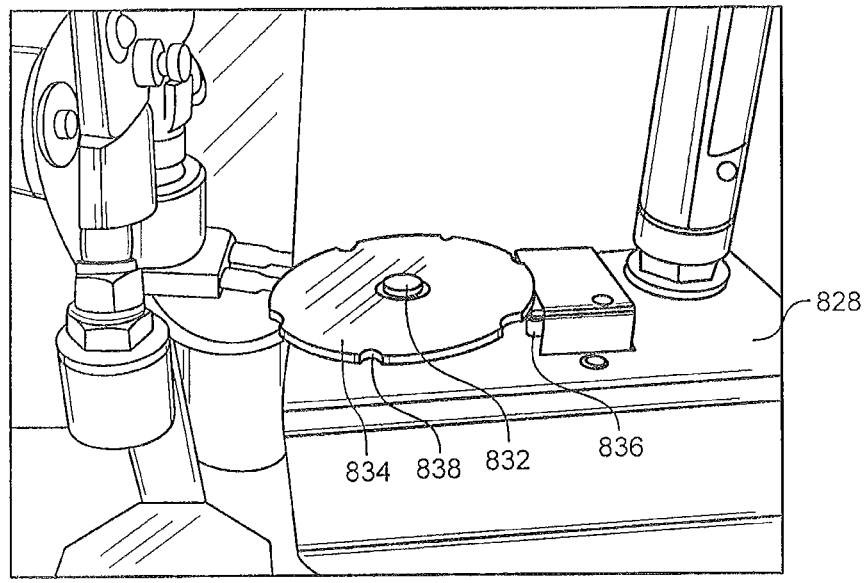
FIG. 16 is a view of a weld cam and switch.

The welding operation may then proceed as at 554 in order to add weld metal to portions of the bottom bearing surface 33 of the male casting. Referring to FIGS. 14-16, in a preferred embodiment, an automatic welding device 818 is applied to the fixture shaft 814 of the fixture 800 to rebuild the bottom bearing surface with weld. An exemplary welding device includes the AutoBoreWelder supplied by Climax Portable Machining & Welding Systems, Inc. of Newberg, Ore. Of course, a number of other welding devices may be utilized without departing from the scope of the present invention.

The welding device 818 includes a torch assembly 820 and a bore welding assembly 822. The torch assembly 820 includes a torch nozzle 824 and a spindle 826 for attachment to the bore welding assembly 822. The spindle 826 is a component of a radial face torch. While any suitable radial face torch may be used, in a preferred embodiment the radial face torch is a Bortech model A1035 Radial Face Torch Assembly provided by Boretech Corporation of Keene, N.H.

Figure 17:
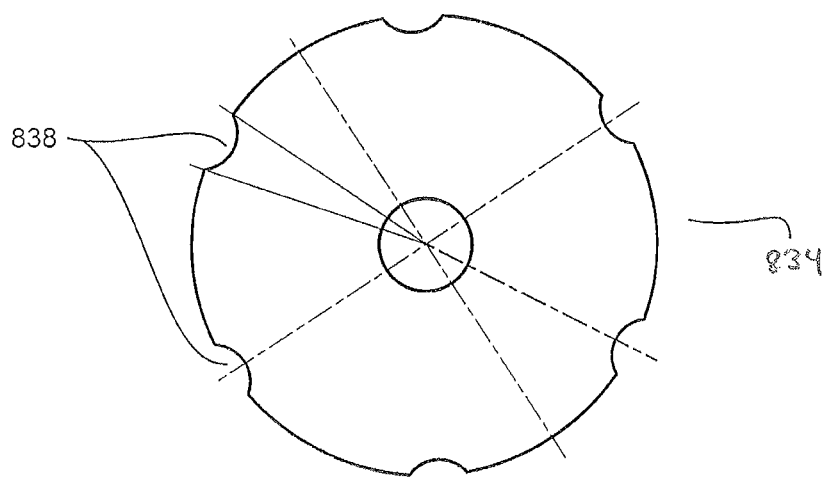
FIG. 17 is a plan view of a weld cam.

The bore welding 822 assembly includes a control unit 828 and a welding facing head 830. The control unit 828 starts and stops the weld process. It includes a control unit shaft 832 that extends upwardly from the control unit, a welding cam 834 located on the control unit shaft, and a roller switch 836 that, as explained further below, is engaged by the welding cam 834 as it rotates on the control unit shaft 832 when the welding device 818 is in operation. Referring to FIGS. 16 and 17, the welding cam 834 includes a series of small detents 838 so that when a detent 838 passes by the roller switch 836, the roller switch 836 will no longer be engaged such that the torch nozzle 824 will cease its welding operation. However, the welding device 818 will continue rotating due to the continued operation of the welding facing head 830. When a portion of the welding cam 834 not having a detent 838 engages the rolling switch 836, the welding will restart. This allows for the intermittent, automatic welding of the bottom bearing surface of the male casting. While in a preferred embodiment there are 6 detents equally spaced apart along the circumference of the welding cam which allows for 15 degrees each of welding interruption, in other embodiments a different amount of detents may be used, or none at all The welding facing head 830 controls the rotation and movement of the welding device 818. It engages with the control unit shaft 832 and, when the welding device is ready for use, the welding facing head is able to rotate 360 degrees during the welding operation.

The bore welding assembly 822 also includes a connecting beam assembly 840 that at one end 822 attaches to the facing head and at the other end 844 is connected to the control unit 828, which forms a connection between the fixture shaft 814 of the welding fixture and the connecting beam assembly 840.

To perform the welding operation 554, the welding fixture 800 is attached to the male casting 10 so that the forward end 28 of the male casting 10 faces the support plate 802. The knobs 810 located on the side arms 808 and support plate 802 may then be rotated so that their respective screws 812 engage with the male casting to secure the welding fixture 800 to the casting 10. Notably, as the screws 812 are tightened, the catch plate 806 will further engage with the inner surface of the anterior surface 54 of the male casting opening.

Figure 18:
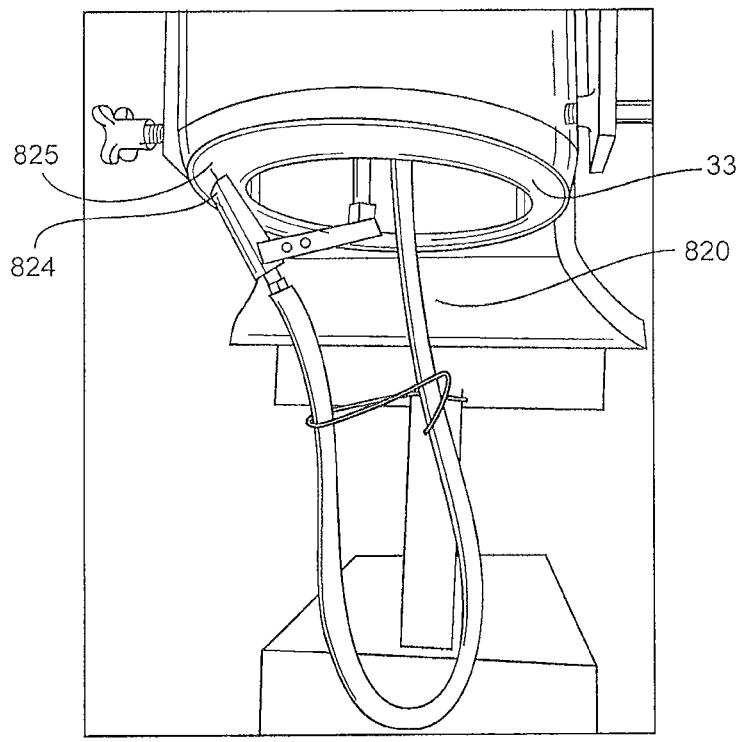
FIG. 18 is a view of a torch assembly and male casting.

The control unit 828 is attached to the fixture shaft 814 of the welding fixture and the torch assembly 820 is passed through the cutout 816 in the base plate 804 from the underside of the casting 10. The spindle 826 of the torch assembly 820 is then connected to the bore welding assembly 822. Referring to FIG. 18, the torch assembly 820 is adjusted so that the torch nozzle 824 is positioned along an outer portion 824 of the bottom bearing surface 33 of the male casting 10. Alternatively, the torch nozzle 824 may be positioned at an inside portion of the bottom bearing surface 33 of the male casting 10.

The welding cam 834 should be rotated so that one of the detents 838 is positioned towards the posterior surface 70 of the opening. The male casting should be preheated as described above and maintained at 300°-500° F. throughout the welding process. This is accomplished through the use of an insulating blanket or an equivalent means. The male casting 10 is reheated as required in order to maintain the proper temperature. By actuating the control unit 828, e.g., with a pushbutton, the welding process may then begin. The welding device will begin to apply the weld at an outer portion of the bottom bearing surface and, as rotation continues, the torch nozzle will rotate inwardly along the bottom bearing surface in a counter-clockwise direction as observed from the top of the casting. Typically, the torch nozzle will make between 10 to 12 passes or revolutions around the bottom bearing surface to apply one layer of weld. Typically, 4-8 layers of weld can be expected to "rebuild" the bottom bearing surface, although the actual number may vary depending on the amount of wear and the desired thickness of the weld. Moreover, preferably the gas used with the welding device will be either 100 percent $CO_2$ or a composition of 75% AR 25% $CO_2$, although other compositions known to those in the art may be used.

Figure 19:
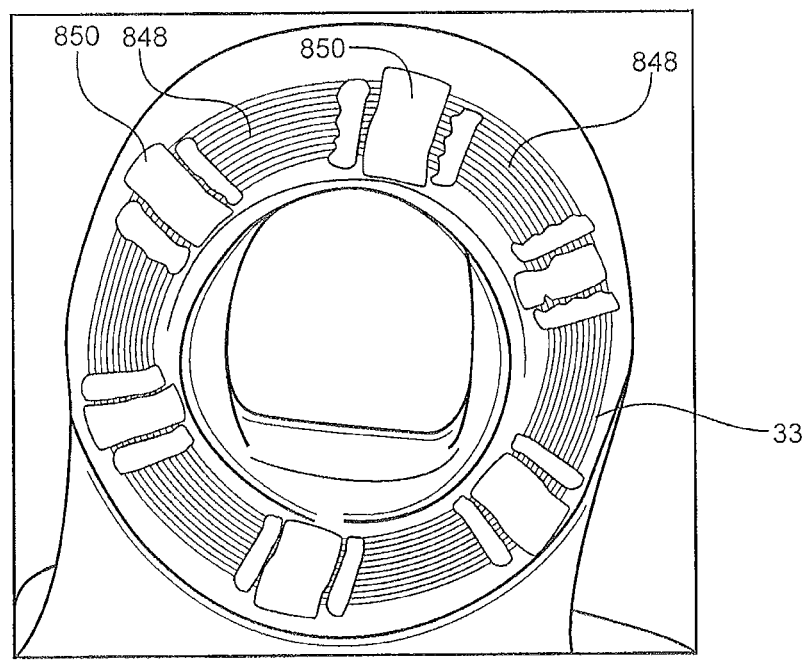
FIG. 19 is a view of a bottom bearing surface of a male casting having an interrupted weld pattern.

As noted above, the presence of the weld cam 834 will cause an interrupted weld pattern to form on the bottom bearing surface. The roller switch 836 of the control unit will disengage when a detent 838 on the weld cam passes over it. This will cause the torch nozzle 824 to stop "welding" until the weld cam again actuates the roller switch. In a preferred embodiment, and as shown in FIG. 19, the weld pattern will be approximately 45 degrees of weld material 848 followed by approximately 15 degrees of no weld 850. When the automatic welding operation is finished, the amount of weld may be measured with a gage to determine if the weld build-up is satisfactory. If the amount is deemed insufficient, the above process may be repeated, with the number of layers applied adjusted accordingly.

The welding device may then be removed from the welding fixture. The areas on the bottom bearing surface having no weld may then be manually "filled in" with weld. Using the same type of gas, the manually-applied weld may be added in the areas 850 that remain free of weld after the automatic welding process. These areas are blended with the automatically applied weld so that the entire bottom bearing surface has been built-up for the machining operation as described below. Notably, the automatic application of the weld material reduces the time an operator is required to weld the bottom bearing surface. Moreover, because this operation allows the weld to be applied from beneath the casting, it also limits any lengthy, awkward manipulation required by the operator, and does not necessitate inversion of the car or casting to perform the welding operation.

After the bottom bearing surface has had the weld applied, it should be allowed to slow cool 557 before proceeding to the machining operation. Desirably, while the welding fixture is still mounted to the casting, the casting will have an insulating box 852, insulating blankets, and/or equivalent means applied to it (FIG. 20) to control the cooling rate of the casting. The insulating box is a two-piece box whose exterior is made out of sheet metal. The insulating box facilitates the cooling of the casting in a measured manner. Otherwise, if the casting cools too quickly, weld material may form cracks or develop other surface failures. The insulating box includes a pair of oppositely situated doors 854. The doors 854 may be either fully opened or fully closed to control the exposure of the casting to ambient air during cooling. Moreover, any portions of the casting that remain exposed, such as due to the presence of any cutouts in the insulating box 852, may be wrapped in an insulating blanket 858.

Once the casting has cooled and the insulating box, blankets and fixture have been removed, the casting is mounted 556 and aligned 558 in the machining fixture 200 so that the machining operation 560 may be performed. As described above, this may include facing, grinding or milling, amongst other suitable operations, in order to remove excess weld to a specified dimension. Referring to FIGS. 6-11, in this semi-automatic method of the present invention, a boring bar assembly 400, facing head assembly 500, and facing head feed control 600 are used. The boring bar assembly 400 drives the facing head assembly 500, which includes a machining tool 502 (FIG. 11), while the feed control 600 provides for the axial feed of the machining tool as welding material is being removed from the bottom bearing surface 33 of the male portion 10 of the casting, and provides for the adjustment of the feed rate of the machining tool 502 during the machining process. In a preferred embodiment, the facing head assembly 500, boring bar assembly 400 and facing head feed control 600 are manufactured by Climax Portable Machining & Welding Systems, Inc. of Newberg, Ore. Of course, other boring bar and facing head assemblies and/or facing head feed controls may be utilized without departing from the scope of the present invention.

Figure 6:
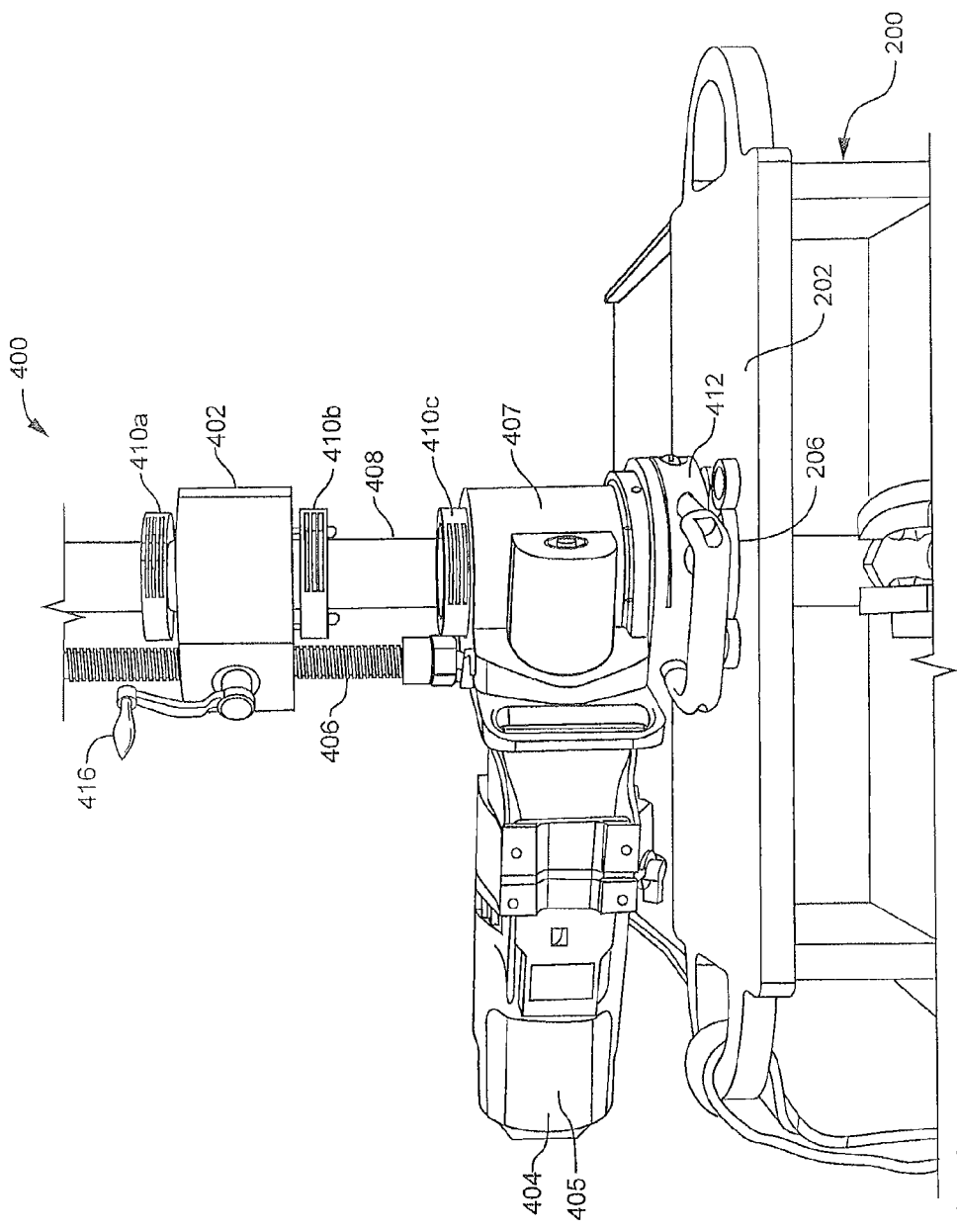
FIG. 6 is a perspective view of a boring bar assembly connected with a fixture for machining a connector casting.
Figure 7:
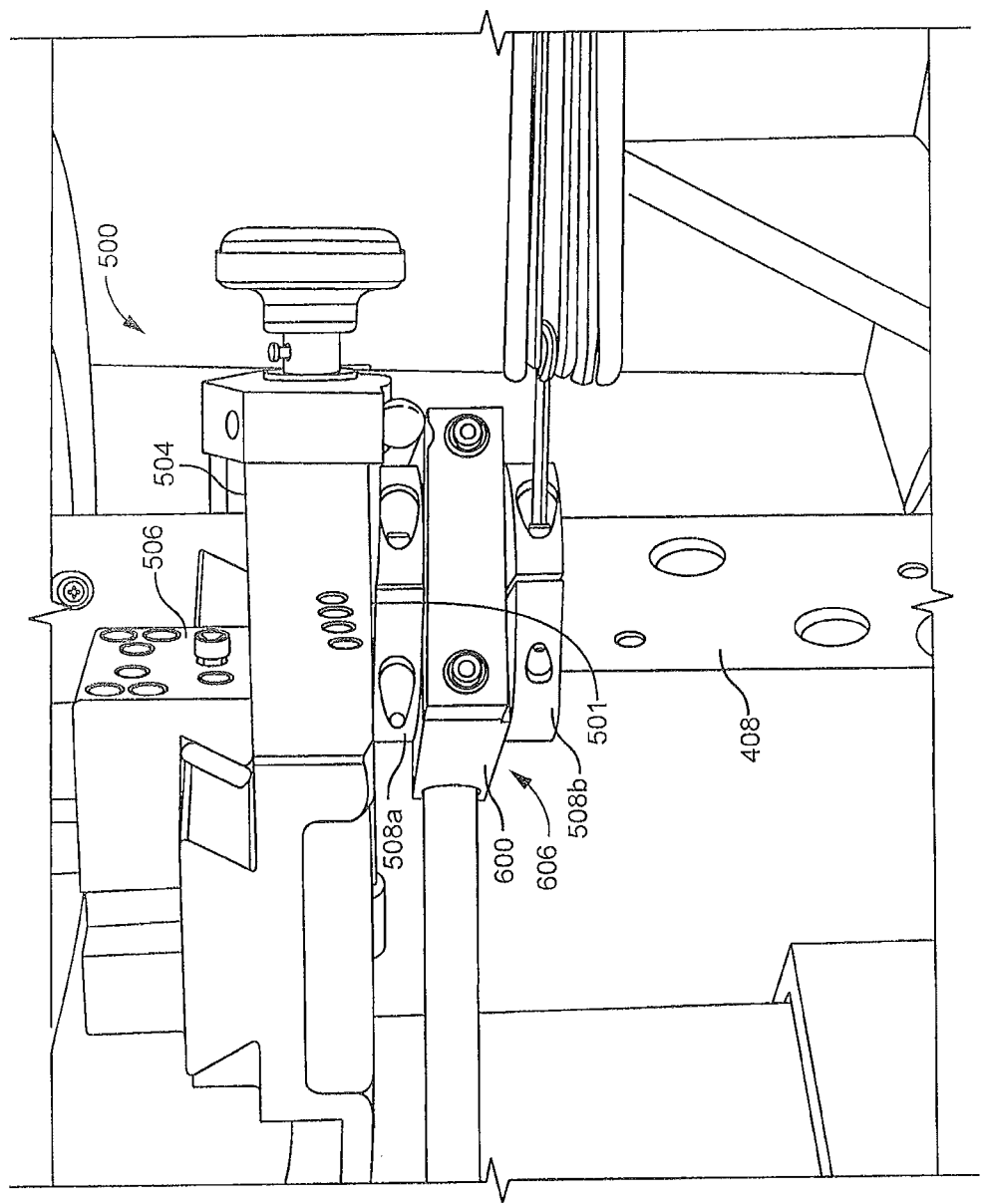
FIG. 7 is a perspective view of a facing head assembly and facing head feed control used for machining.
Figure 8:
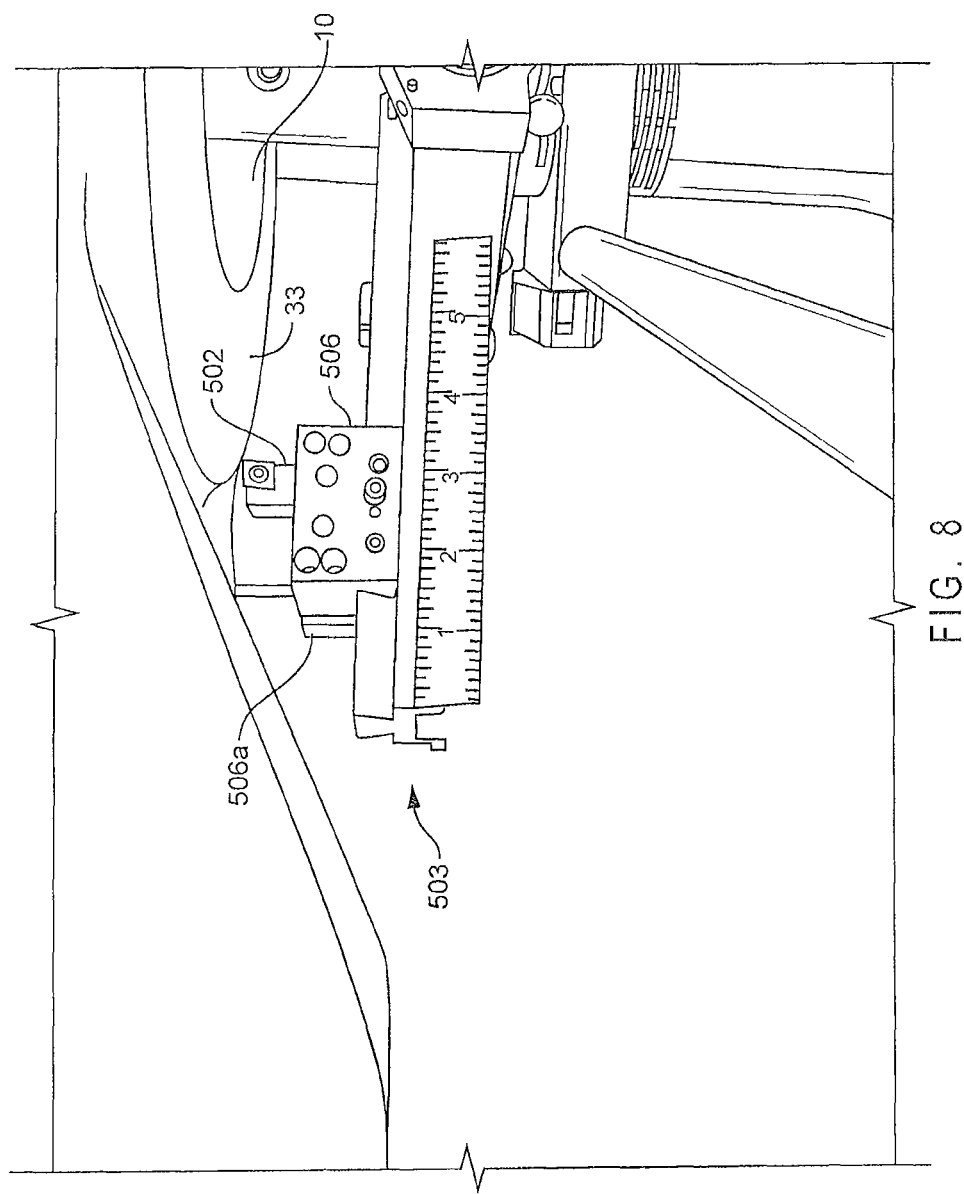
FIG. 8 is another perspective view of a facing head assembly and facing head feed control beneath a male casting to be machined.

Referring to FIG. 6, the boring bar assembly 400 includes an axial feed assembly 402, a rotational drive assembly 404, lead screw 406, boring bar 408, a plurality of clamp collars 410a-c and a clamp ring 412. As explained further below, the boring bar assembly 400 is affixed to the fixture by the insertion of the boring bar 408 into the bearing in the first opening 206 of the top plate 202. Notably, the axial feed assembly 402 provides for the adjustment and movement of the boring bar 408 in a vertical direction through its engagement with the lead screw 406. The rotational drive assembly 404 includes a motor 405 and rotational drive unit 407 that together drive and provide for the rotation of the boring bar 408. In addition to the machining tool 502, the facing head assembly 500 includes a facing head 504, and a facing head carriage 506. As described below, the facing head assembly 500 is connected to the boring bar 408 and thus rotates when the boring bar 408 is being driven by the rotational drive assembly 404. The facing head assembly 500 retains the machining tool 502 that machines the bottom bearing surface 33 of the casting 10. The facing head feed control 600 is in mechanical contact with the facing head assembly 500 and controls the feed rate, i.e., the rate the cutting tool moves or is "fed" in an inward direction along the bottom bearing surface as weld material is removed. It includes a feed adjustment 602 and jam wheel 604. The jam wheel 604 locks the feed adjustment 602 into place. When the jam wheel 604 is loosened, the feed adjustment 602 may be adjusted to change the feed rate of the machining tool 502.

To perform the machining operation, the boring bar assembly 400 is positioned above the fixture 200 applied to the casting 10. As part of the boring bar assembly 400, clamps 410a and 410b are secured to the boring bar 408 to prevent the boring bar 408 from falling out of the axial feed assembly 402 and rotational drive unit 407 when positioning the boring bar assembly 400. The boring bar 408 is inserted into the first bearing 238 in the top plate 202, completely through the first opening 206 and completely through the male casting opening 32. However, clearance should be left above the second bearing 240 in the bottom plate 204 sufficient to position the facing head assembly 500 upwardly onto the boring bar 408. Following the facing head assembly is a clamp collar 508a, the facing head feed control 600, and another clamp collar 508b. Thereafter, the end 414 of the boring bar 408 is positioned through the second bearing 240 until the boring bar assembly clamp ring 412 covers the first bearing 238. The clamp ring 412 is then secured over the first bearing 238, such as through the use of a push-button, spring-loaded lock.

Figure 9:
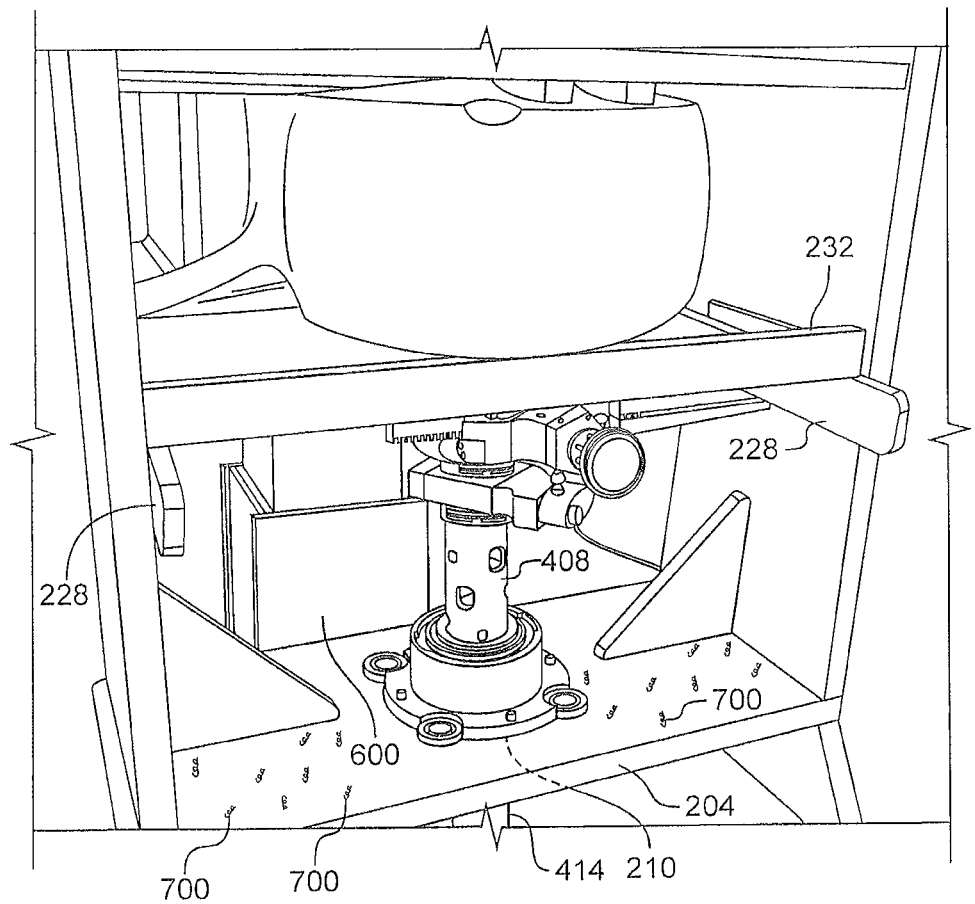
FIG. 9 is a view of a machining fixture for reconditioning a casting showing a facing head assembly and facing head feed control mounted to the fixture including the application of a gauge.
Figure 10:
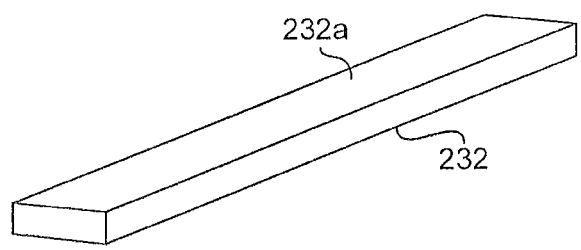
FIG. 10 is a perspective view of a gauge bar.
Figure 11:
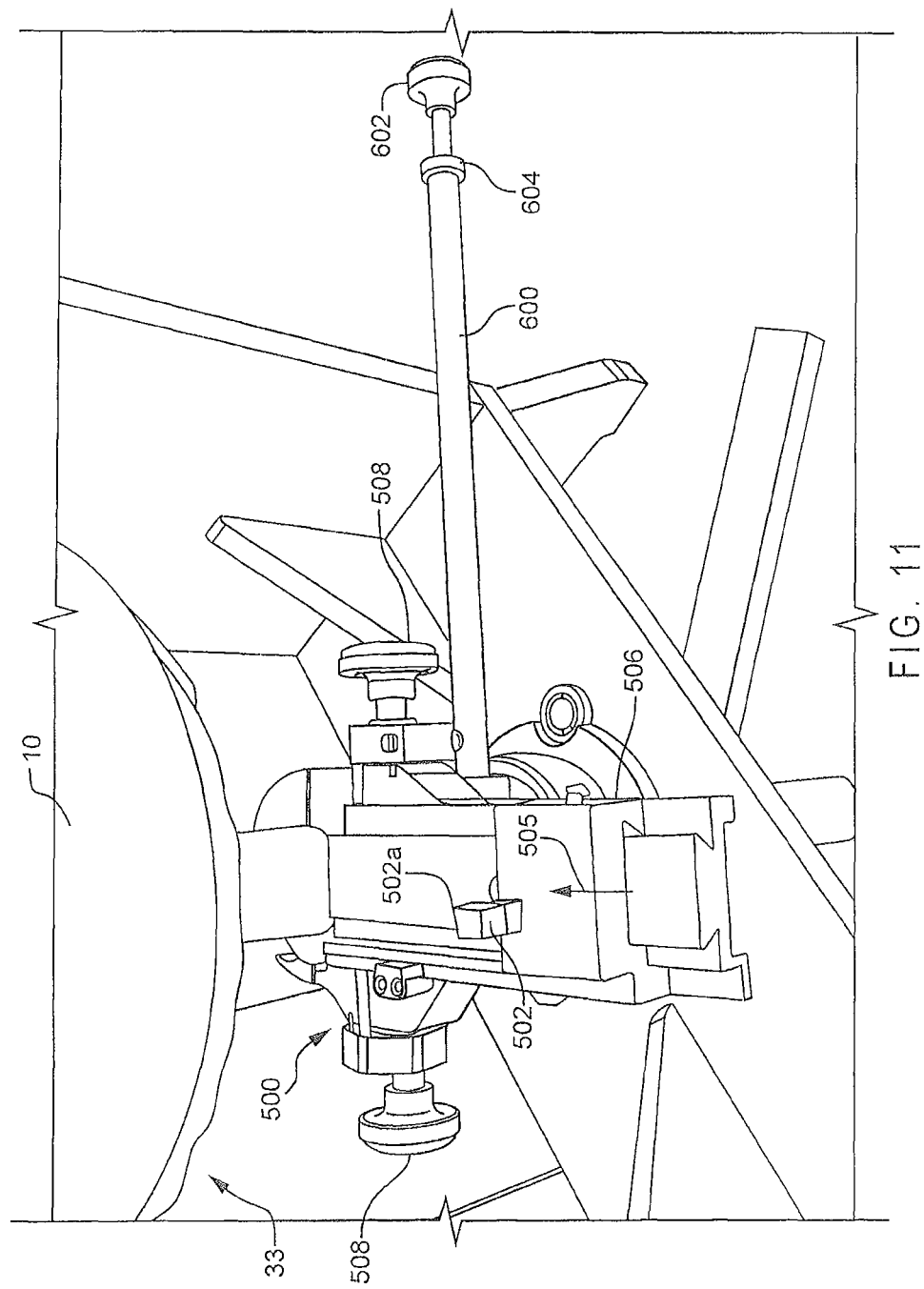
FIG. 11 is another perspective view of a facing head assembly and facing head feed control beneath a male casting to be machined.

The machining tool 502 is also positioned by first determining the lowermost point of the material on the bottom bearing surface 33 to be machined. As shown in FIG. 9, the gauge bar 232 is positioned so that a primary flat side 232a (FIG. 10) is horizontal across the support bars 228. Then, such as through the use of a scale or tape measure, the location of the lowermost point from the flat side 232 of the gauge bar to the material requiring machining on the bottom bearing surface 33 is assessed and marked. Other methods may also apply.

The machining tool 502 is positioned in the tool holder carriage 506 and secured. As noted above, the tool may be a facing or similar cutting tool to facilitate the removal of weld material. The facing head assembly 500 is slid upwards on the boring bar 408 until the tip 502a of the cutting tool 502 is positioned close to the lowermost location of weld material on the bottom bearing surface 33, preferably within ¼ inch.

The facing head assembly 500 is securely fastened to the boring bar 408. The clamping collar 508a is slid into direct contact with the underside 501 of the facing head assembly 500 and fastened to the boring bar 408. The facing head feed control 600 is positioned loosely against the clamping collar 508. Another clamping collar 508b is slid upwards into direct contact with the underside 606 of the facing head feed control 600 and securely fastened to the boring bar 408.

The remainder of the set up provides for "fine tuning." The tolerances provided below are exemplary, and other tolerances may be used depending on machining requirements. The axial feed 402 includes a crank 416 that can be manually engaged to move the boring bar 408 upwardly so that the tip 502a of the tool 502 comes within about 0.030 inches of a material low point of the area to be machined. The crank 416 thereafter is engaged downward for about one-half turn or 0.050 inches. The facing head also includes a pair of carriage control knobs 508, one of which can be engaged to position the outboard end 506a of the tool holder carriage 506 at a desired distance from the end 503 of the facing head. The tool holder carriage 506 are secured into place so it does not move. In one preferred embodiment, a pin and detent configuration may be used so that the carriage control knob "locks" the tool holder carriage 506 into place.

The facing head assembly 500 and machining tool 502 are rotated to the rear of the casting by engaging the rotational drive system 404, such as through a pushbutton (not shown). Once the facing head assembly 500 is in position, the rotational drive system 404 is disengaged. The crank 416 of the axial feed 402 is then engaged for about one full turn so that the boring bar 408 moves upwardly about 0.100 inches towards the area to be machined. Clamp 410c is then secured and the crank 416 of the axial feed 402 is disengaged. In one preferred embodiment, the crank has pins that engage with detents associated with the axial feed, so that when the pins are disengaged the axial feed is locked into place. Once ready to begin the actual machining, the boring bar 408 is engaged by depressing the push button, which results in the rotational movement of the facing head assembly 500. If the above settings are incorporated, approximately 0.020 inches of material will be removed from the bottom bearing surface. However, as noted above, this embodiment is exemplary, and other settings may be used so that a greater or lesser amount of material is removed.

Advantageously, an operator may monitor the machining process without having to perform it, which as described above may require operator to either grind the bottom bearing surface from underneath the casting, or else require that the casting (and potentially the railcar) be inverted. Each of these techniques requires large amounts of time and are undesirable because the former requires a lengthy, awkward manipulation by the operator while the latter requires the manipulation of large equipment (casting and/or railcar). Moreover, articulated connectors are not suited for such removal from the railcar since they are integral to the car and such repair would be inefficient, time consuming, and expensive.

In a preferred embodiment, during machining it is desirable to feed the tool holder and carriage 506 inwardly along the bottom bearing surface approximately 0.010 inches per revolution of the machining tool 502. Feed adjustment may be made by loosening the jam wheel 604 and turning the feed adjustment 602 in the appropriate direction. In this embodiment, counter-clockwise rotation of the feed adjustment 602 decreases feed, while clockwise rotation of the feed adjustment increases feed. If the feed is unknown, an initial slower setting may be used until the desired feed is achieved, at which time the jam wheel 604 may be resecured.

Moreover, metal chips 700 (FIG. 9) created by the machining process may need to be removed during the machining process. One way to accomplish chip removal is through the use of a low-pressure hose to blow chips away.

Once machining is complete, the equipment may be disengaged to determine whether the desired casting dimension has been achieved, i.e., the casting undergoes qualification 562. In a preferred embodiment, this will occur after one pass along the bottom bearing surface by the cutting tool 502. However, in the majority of cases, more than one pass will be necessary. The uppermost clamp collar 410c at the top of the boring bar 408 is loosened and the crank 416 moves the boring bar 408 downwardly so that the cutting tool is moved in a downward direction away from the bottom bearing surface. As such, the facing head assembly 500 is moved so it is not in the way during qualification. The gauge bar 232 is positioned on the support bars 228 so that the primary flat side 232a is vertical. In a preferred embodiment, if the gauge bar 232 can be slid under the machined casting surface and the clearance between the gauge bar and the machined surface is within $1/16$ inches, then the desired dimension has been achieved. Additionally, it may be desirable to have the cumulative total of the non-machined areas of the bottom bearing surface not be greater than approximately one inch in diameter. If these tolerances are not satisfied, the process described above may be repeated, except that the boring bar crank 416 may be turned further to raise the facing head assembly 500 towards the bottom bearing surface so that additional material is removed. Upon completion of machining, sharp edges of the bottom bearing surface are ground with a radius of about $1/16"$-$1/8"$ and remaining weld buildup is blended to the existing adjacent casting surfaces. The restored surface is then checked for defects.

Reconditioning Through the Use of Wear Plates

This alternate method does not require the application of a built-up weld followed by grinding, as described above. Referring to FIG. 12, a wear plate 900 instead may be welded or mechanically attached to a wear surface 901 of the male casting that has been machined or ground flat using processes like those noted above. The wear surface will be prepared as described above (e.g., machined, ground, burrs are removed, etc.) so that it is prepared to have a wear plate welded to it. By way of example, as to the bottom bearing surface 33, the bottom bearing surface itself will act as the surface to which the wear plate is welded.

The wear plate may include a substrate layer 904 and a welded layer 902 (shown in exaggerated form in FIGS. 12, 12a, and 12b). The substrate layer 904 is typically made of a weldable material and is the layer that is welded for attachment to the bottom bearing surface 33. One suitable material is a weldable steel substrate, while in other embodiments, a low carbon or high-strength low-alloy steel may be used. The welded layer 902 acts in place of the built-up weld material described previously. The surface 906 of the welded layer will come in contact with the spherical ring surface 25 when the male casting 10 is inserted into the female casting 12. Prior to attachment of a wear plate, the bottom bearing surface may be machined using the techniques described above until the desired casting dimension is achieved, which can be determined by measuring the casting with a gage. Preferably, the weld layer 902 of the wear plate 900 is made from chromium carbide, although other suitable materials may be used such as hard-facing weld material. Other options for the wear plate include, without limitation, wear plates case or flame hardened or having had other resistant surface treatments. Wear plates made completely out of materials like those noted for the substrate layer are also an option. The wear plate could also be comprised of stainless steel.

Figures 21, 22:
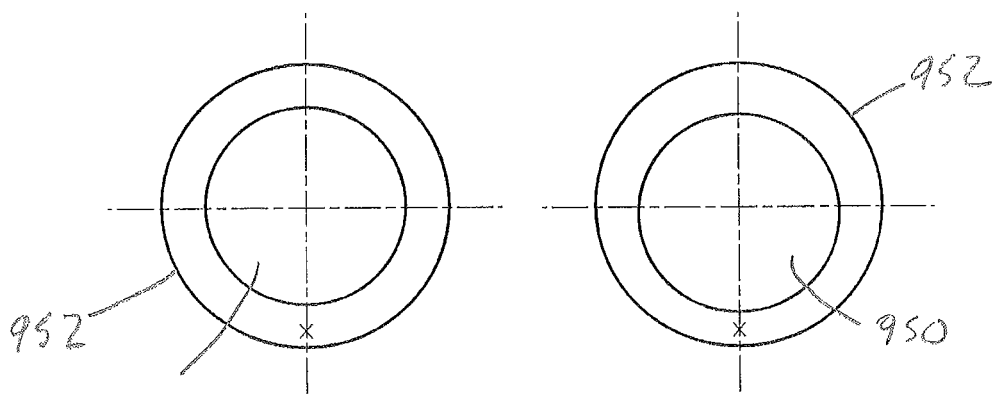
FIGS. 21 and 21a illustrate a concentric wear plate.
FIGS. 22 and 22a illustrate an offset wear plate.
Figure 23:
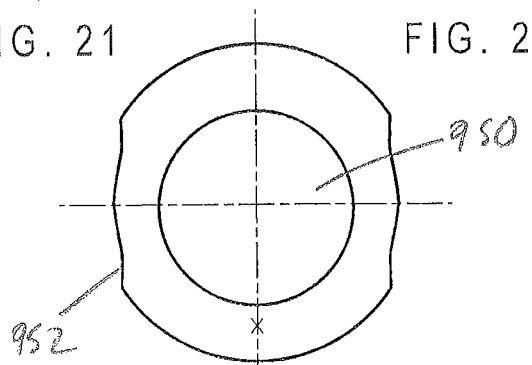
FIGS. 23 and 23a illustrate a modified wear plate.
Figure 21A:
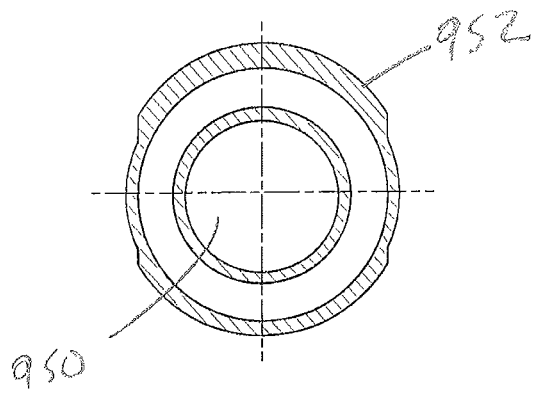
Figure 22A:
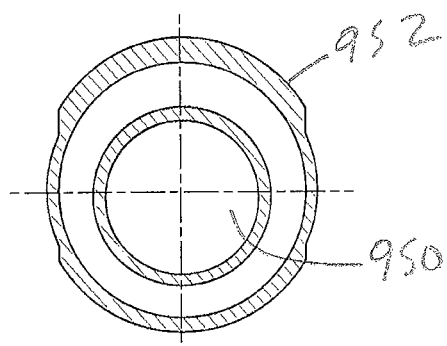
Figure 23A:
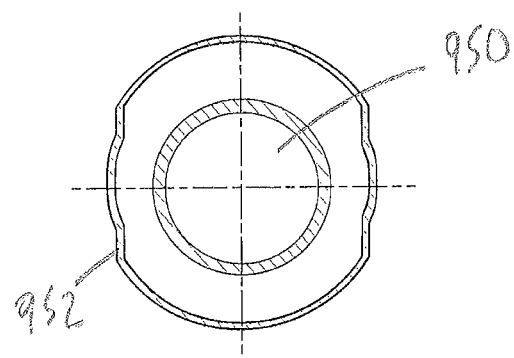

Accordingly, the casting may be reconditioned at a faster rate since the weld does not have to be built up. Rather, the wear plate needs only to be attached to the prepared wear surface. Notably, this procedure also may be used to recondition the bottom bearing surface 3000 of the female casting. Many alternative embodiments of the wear plate described herein are envisioned. For example, the opening 950 in the wear plate 900 may be concentric to the outside edge 952 of the wear plate 900 as shown in FIG. 21. Alternatively, as shown in FIG. 22, the opening 950 in the wear plate 900 can have an offset, or non-concentric relationship to the outside edge 952 of the wear plate 900. In another alternative embodiment, the outside edge 952 of the wear plate 900 is not circular, rather it has cutout portions. Other shapes are also envisioned.

Of course, one skilled in the art will realize that the machines, fixtures, tools and gauges used in the above embodiment of the reconditioning method are only exemplary and many alternatives exist. The examples illustrated herein are therefore not meant to be restricting. Moreover, while the ASF male castings are described, as known to those of ordinary skill in the art, the methods and equipment described herein may readily be adapted to be applied to other types of male castings, such as, for example, from National Castings, as well as to female castings. If the methods herein are applied to female castings 12, the bottom bearing (or spherical ring) surface 3000 may be reconditioned in this fashion.

The invention claimed is:

1. An apparatus for measuring a portion on an articulated connector relative to a reference portion of said connector, said apparatus comprising: a fixable base mountable to said connector against said reference portion of said connector; and an arm pivotally mounted to said base and extendable toward said portion of said connector; said arm having a measurement portion, said measurement portion movable across at least a section of said portion of said connector, and a rotating component connected to a mounting piece.

2. The apparatus of claim 1, wherein the rotating component has a first side and a second side and may be mounted to the mounting piece with either the first side facing up or the second side facing up.

3. The apparatus of claim 2, wherein the first side measures whether more weld material must be added to the surface of the connector.

4. The apparatus of claim 3, wherein the second side measures whether weld material must be removed from the surface of the connector.

5. The apparatus of claim 1 wherein said fixable base further comprises a screw mechanism connected to a brace end, said screw mechanism adapted to urge said brace end against said reference portion.

6. The apparatus of claim 1 wherein said fixable base further comprises a clamping mechanism for engaging an inner portion of said connector.

7. The apparatus of claim 6 wherein said screw mechanism and brace end are mountable within a bore of said connector.

8. The apparatus of claim 7 wherein said fixable base complements the shape of said bore of said connector.

* * * * *